United States Patent
Zhao et al.

(10) Patent No.: US 12,517,566 B2
(45) Date of Patent: Jan. 6, 2026

(54) METHOD FOR REDUCING DEVICE POWER CONSUMPTION, ELECTRONIC DEVICE, AND MEDIUM THEREOF

(71) Applicant: Honor Device Co., Ltd., Shenzhen (CN)

(72) Inventors: Heping Zhao, Shenzhen (CN); Lei Zhong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/837,485

(22) PCT Filed: Apr. 12, 2023

(86) PCT No.: PCT/CN2023/087895
§ 371 (c)(1),
(2) Date: Aug. 9, 2024

(87) PCT Pub. No.: WO2024/032014
PCT Pub. Date: Feb. 15, 2024

(65) Prior Publication Data
US 2025/0147568 A1 May 8, 2025

(30) Foreign Application Priority Data
Aug. 11, 2022 (CN) .......................... 202210965621.8

(51) Int. Cl.
*G06F 3/01* (2006.01)
*G06F 1/3218* (2019.01)
*G06F 1/3234* (2019.01)
*G06F 1/3246* (2019.01)
*G06F 1/3287* (2019.01)
*G06F 11/34* (2006.01)

(52) U.S. Cl.
CPC .......... *G06F 1/3218* (2013.01); *G06F 1/3246* (2013.01); *G06F 1/3265* (2013.01); *G06F 1/3287* (2013.01); *G06F 11/3438* (2013.01)

(58) Field of Classification Search
CPC .... G06F 1/3218; G06F 1/3246; G06F 1/3265; G06F 1/3287; G06F 11/3438; H04M 1/725
See application file for complete search history.

(56) References Cited

U.S. PATENT DOCUMENTS

| | | |
|---|---|---|
| 8,635,475 B2 | 1/2014 | Lin et al. |
| 9,715,265 B1 | 7/2017 | Cairns et al. |
| 2009/0320055 A1 | 12/2009 | Langille et al. |

(Continued)

FOREIGN PATENT DOCUMENTS

| | | |
|---|---|---|
| CN | 203014994 U | 6/2013 |
| CN | 104866066 A | 8/2015 |

(Continued)

*Primary Examiner* — Abdul-Samad A Adediran
(74) *Attorney, Agent, or Firm* — Slater Matsil, LLP

(57) ABSTRACT

This application relates to terminal devices, specifically to a method for reducing device power consumption, an electronic device, and a medium thereof. The method identifies different video playback scenarios and determines if a user is still watching a video based on user inactivity in these scenarios. When it is determined that the user is not watching the video, the power consumption of the terminal device is reduced.

20 Claims, 29 Drawing Sheets

(56) References Cited

U.S. PATENT DOCUMENTS

| | | |
|---|---|---|
| 2010/0079508 A1 | 4/2010 | Hodge et al. |
| 2015/0058649 A1 | 2/2015 | Song et al. |
| 2017/0280393 A1 | 9/2017 | Suo |
| 2020/0227005 A1* | 7/2020 | Zhang .................. H04M 1/725 |

FOREIGN PATENT DOCUMENTS

| | | |
|---|---|---|
| CN | 106131337 A | 11/2016 |
| CN | 106200872 A | 12/2016 |
| CN | 106547444 A | 3/2017 |
| CN | 111291666 A | 6/2020 |
| CN | 114760484 A | 7/2022 |

* cited by examiner

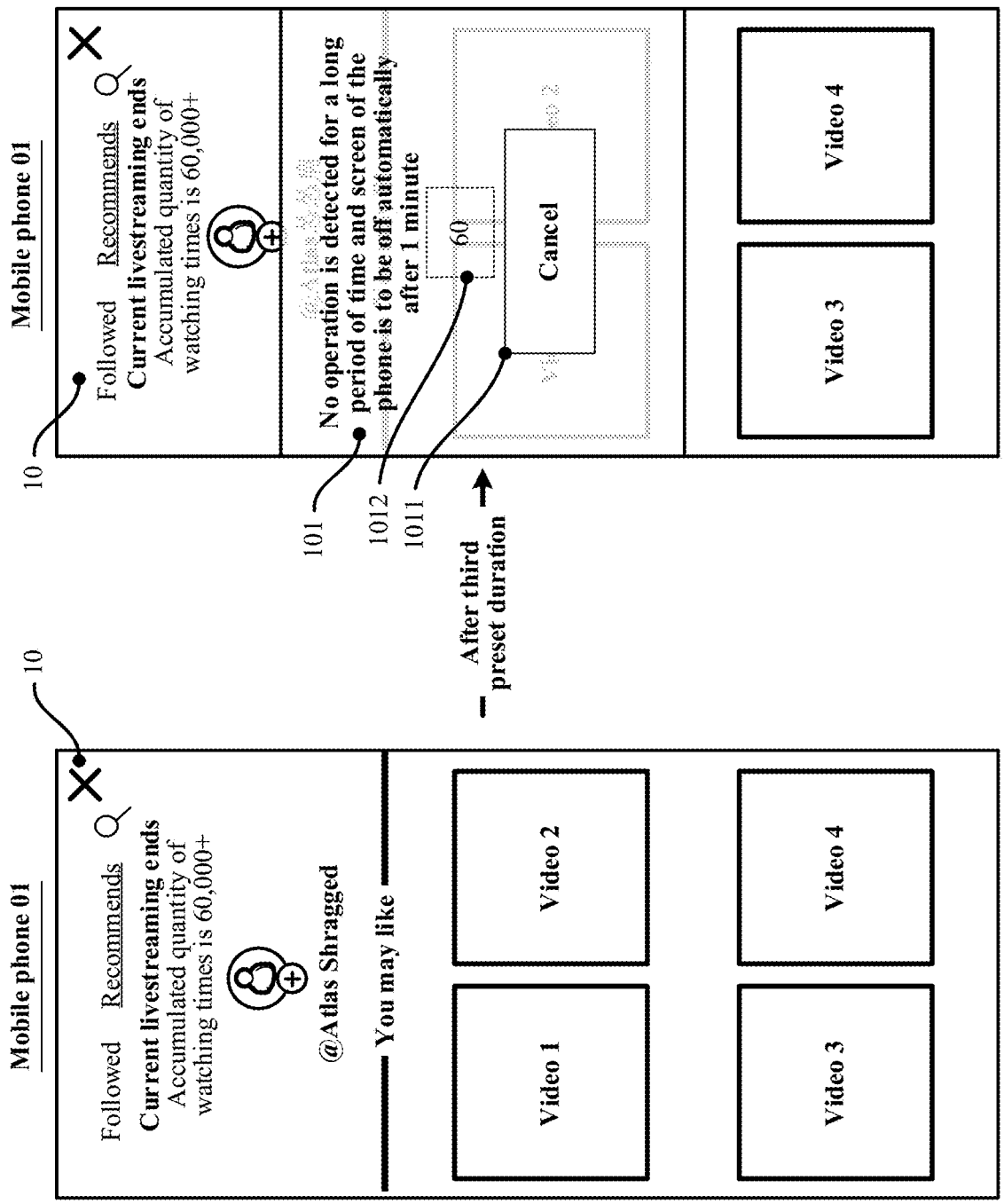

METHOD FOR REDUCING DEVICE POWER CONSUMPTION, ELECTRONIC DEVICE, AND MEDIUM THEREOF

CROSS-REFERENCE TO RELATED APPLICATIONS

This application is a National Stage of International Application No. PCT/CN2023/087895, filed on Apr. 12, 2023, which claims priority to Chinese Patent Application No. 202210965621.8, filed on Aug. 11, 2022, both of which are hereby incorporated by reference in their entireties.

TECHNICAL FIELD

This application relates to the field of terminal devices, and in particular, to a method for reducing device power consumption, an electronic device, and a medium thereof.

BACKGROUND

Research has found that many users are accustomed to using a terminal device such as a mobile phone to watch videos provided by video applications such as TikTok® and Kuaishou®. In this case, if the user does not actively turn off the screen, a video in a video application is to be played in loop or until the end of a live stream, or videos are to be played in an automatic playback mode (for example, the next episode in a television series is to be automatically played). During this period, the terminal device such as a mobile phone continuously consume power until the mobile phone is powered off due to low battery.

In addition, when the terminal device such as a mobile phone is placed at a position with poor heat dissipation, the foregoing situation may cause an excessively fast temperature rise of the battery of the terminal device such as a mobile phone, leading to abnormal occurrences such as bulge or fire of the battery. This affects the service life of the battery of the mobile phone, and more seriously, personal safety of the user may be endangered.

SUMMARY

To resolve the foregoing problems, this application provides a method for reducing device power consumption, an electronic device, and a medium thereof. According to the method in this application, different video playback scenarios are identified, then whether a user is still watching a video in a current video playback scenario is determined based on a situation in which the user is not using a mobile phone in different video playback scenarios, and power consumption of a terminal device is reduced when it is determined that the user is not watching the video. In this way, whether the user is still watching the video can be pertinently determined based on the current video playback scenario, and the power consumption of the device can be reduced when it is determined that the user is not watching the video, thereby facilitating protection of a battery of the terminal device, and preventing occurrences such as bulge or fire due to an excessively fast temperature rise of the battery of the mobile phone when the mobile phone is placed at a position with poor heat dissipation conditions or with no heat dissipation condition. This is conductive to personal safety of the user, and user experience is improved.

According to a first aspect, an embodiment of this application provides a method for reducing device power consumption, applied to an electronic device. The method includes: the electronic device being in a first video playback scenario; determining that a user is not using the electronic device and that a video state on the electronic device satisfies a first state condition in the first video playback scenario; and performing at least one operation of reducing power consumption of the electronic device.

In some implementations, the first video playback scenario includes a video loop playback scenario, an automatic video playback scenario, and a video livestreaming scenario.

To be specific, according to the foregoing method, if it is determined that a user is not using the electronic device and that a state of a video currently played by the electronic device satisfies a first state condition in the first video playback scenario, it is determined that the user is not watching the video. In this case, at least one operation of reducing power consumption of the electronic device is performed. In some implementations, the user not using the electronic device means that the user has not interacted with the electronic device for a long period of time or the electronic device has been in a screen-on state for a long period of time, the electronic device is in a static state, or the user is in a sleep state. The electronic device being in a static state means determining that the electronic device has been in an unmoved state for a long period of time based on sensor data of the electronic device. In this case, it may alternatively be determined that the user is not using the electronic device. In an implementation of this application, the electronic device may also be referred to as a terminal device.

It may be understood that in different video playback scenarios, video states are different when the user is not watching or has not operated the electronic device for a long period of time. Therefore, it is required to determine, based on whether the first state condition corresponding to the video playback scenario is satisfied in the first video playback scenario corresponding to the electronic device, whether the user is not watching the video or has not operated the electronic device for a long period of time, to determine whether to perform the operation of reducing the power consumption of the electronic device. According to the method, the device power consumption can be reduced after determining that the user is not watching a video in different video playback scenarios, thereby facilitating protection of a battery of the electronic device can be maintained, and preventing occurrences such as bulge or fire due to an excessively fast temperature rise of the battery. This is more conductive to personal safety of the user, and user experience is improved.

With reference to the first aspect, in a possible implementation, the determining that a user is not using the electronic device includes at least one of the following: determining that duration in which the electronic device is in a screen-on state is longer than first preset duration; determining that no first operation performed by the user on the electronic device is detected by the electronic device for more than second preset duration; determining that the electronic device is in a static state; or determining that the user is in a sleep state. The first preset duration and the second preset duration are empirical values or experimental values. This is not limited in this application. The first operation may be an operation of tap/click, double tap/double click, press, and the like performed by the user on the electronic device, or a voice instruction made by the user to activate a response function in the electronic device.

With reference to the first aspect and the foregoing possible implementation, in a possible implementation, the first video playback scenario includes a video loop playback scenario, and that a video state on the electronic device satisfies a first state condition in the first video playback scenario includes: a quantity of times the electronic device plays a same video in loop is greater than a first threshold; and/or duration in which the electronic device plays a same video in loop is longer than third preset duration. To be specific, if duration in which a same video is played in loop is greater than a value, or a quantity of loop playbacks is greater than a value, it may be determined that the user is not watching the video. The first threshold is an empirical value or an experimental value. This is not limited in this application.

With reference to the first aspect and the foregoing possible implementation, in a possible implementation, the first video playback scenario includes an automatic video playback scenario, and that a video state on the electronic device satisfies a first state condition in the first video playback scenario includes: a quantity of different videos played by the electronic device is greater than a second threshold; and/or duration of playing different videos by the electronic device is longer than fourth preset duration. To be specific, if a quantity of videos automatically played exceeds a value, or duration in which videos are automatically played exceeds a value, it may also be determined that the user is not watching the videos. The second threshold and the fourth preset duration are empirical values or experimental values. This is not limited in this application.

With reference to the first aspect and the foregoing possible implementation, in a possible implementation, the first video playback scenario includes a video livestreaming scenario, and that a video state on the electronic device satisfies a first state condition in the first video playback scenario includes: no second operation performed by the user on the electronic device is detected by the electronic device within fifth preset duration after playback of a current video ends. To be specific, if no second operation performed by the user is detected after livestreaming of a live video ends, it may be determined that the user is not watching the video.

With reference to the first aspect and the foregoing possible implementation, in a possible implementation, the method further includes: when a third operation performed by the user on the electronic device is detected, skipping performing or stopping performing the operation of reducing the power consumption of the electronic device. To be specific, even if it is determined that the user is not using the electronic device and that the video state on the electronic device satisfies the first state condition in the first video playback scenario, it indicates that the user is still watching the video if a third operation performed by the user is detected thereafter. In this case, the operation of reducing the power consumption of the electronic device is skipped performing or stopped performing.

With reference to the first aspect and the foregoing possible implementation, in a possible implementation, the third operation includes at least one of tap/click, double tap/double click, or press performed by the user on the electronic device.

With reference to the first aspect and the foregoing possible implementation, in a possible implementation, the method further includes: displaying a first user interface, where the first user interface is configured to prompt the user that the electronic device is to be controlled to turn off a screen after sixth preset duration; and if no fourth operation performed by the user is detected within the sixth preset duration, controlling the electronic device to enter a screen-off state, and reducing the power consumption of the electronic device, where the fourth operation is for controlling the electronic device to skip performing or stop performing the operation of reducing the power consumption of the electronic device. To be specific, if it is determined that the user is not using the electronic device and that the video state on the electronic device satisfies the first state condition in the first video playback scenario, the electronic device displays a first user interface, and the user is prompted to perform a fourth operation to control the electronic device to skip performing or stop performing the operation of reducing the device power consumption of the, to more accurately determine that the user is not watching a video. In addition, the first user interface displays a countdown of the electronic device entering the screen-off state (that is, the foregoing sixth preset duration), and during this period, whether the user perform the fourth operation is detected. When no fourth operation performed by the user is detected within the sixth preset duration, the electronic device is controlled to enter the screen-off state.

With reference to the first aspect and the foregoing possible implementation, in a possible implementation, the first user interface includes a first control, and the fourth operation includes an operation of tapping/clicking the first control by the user. To be specific, in some implementations, the first user interface may include a first control, for example, 1011 shown in the following FIG. 11C. Then, when it is detected that the user taps/clicks the first control, it is determined that the user performs the fourth operation. It may be understood that in this way, it may be determined that the fourth operation is performed consciously by the user rather than an unconscious action, to more accurately determine whether the user is watching a video.

With reference to the first aspect and the foregoing possible implementation, in a possible implementation, the operation of reducing the power consumption of the electronic device includes at least one of the following: controlling the electronic device to enter the screen-off state; reducing screen brightness of the electronic device;
    reducing resolution and a frame rate of a video currently played by the electronic device; disabling an update function of a background application of the electronic device; or switching a network positioning method of the electronic device.

With reference to the first aspect and the foregoing possible implementation, in a possible implementation, determining that the first video playback scenario of the electronic device is the video loop playback scenario includes: obtaining a first image of a first video played by the electronic device at a current moment; obtaining, at an interval of seventh preset duration, a second image of a second video played by the electronic device; and determining image similarity between the first image and the second image, and when the similarity between the first image and the second image is greater than a first similarity threshold, determining that the first video playback scenario of the electronic device is the video loop playback scenario. It may be understood that for the video loop playback scenario, because a same video is played, two images having the same or very similar content can be obtained. Therefore, in the foregoing manner, the first image of the first video currently played is obtained, then after an interval of the seventh preset duration (generally duration of the video), the second image of the second video currently played is obtained, and then compare the image acquaintance of the two images. If the similarity between the first image and the second image is greater than the first similarity threshold, it indicates that the first image and the second image are the same. In this case, it may be determined that the current video playback scenario is the video loop playback scenario.

With reference to the first aspect and the foregoing possible implementation, in a possible implementation, determining that the first video playback scenario of the electronic device is a video livestreaming scenario includes: when a video currently played by the electronic device ends, obtaining a third image of the video currently played; and recognizing text content in the third image by using an image recognition method, and when the text content in the third image includes a preset keyword, determining that the first video playback scenario of the electronic device is the video livestreaming scenario. The preset keyword includes a keyword indicating that a type of the video currently played by the electronic device is a live video. The preset keyword includes but is not limited to "livestreaming", "live", and the like. This is not limited in this application.

With reference to the first aspect and the foregoing possible implementation, in a possible implementation, the seventh preset duration includes video duration of the first video.

With reference to the first aspect and the foregoing possible implementation, in a possible implementation, an Android operating system is deployed on the electronic device, and the Android system of the electronic device includes a video application located at an application layer and a layer display control module located at an application framework layer. The video application is configured to: receive a playback instruction for a third video; and when the video playback instruction is received, send to the layer display control module an instruction for creating a first layer. The instruction at least instructs the layer display module to create the first layer corresponding to a video type of the third video. The layer display control module creates the first layer in response to the instruction. The first layer is for playing the third video. The first layer includes a layer identifier. The layer identifier includes at least information of the video type of the third video. In addition, the method further includes: determining, based on the identifier corresponding to the first layer, a type of the first video playback scenario of the electronic device.

With reference to the first aspect and the foregoing possible implementation, in a possible implementation, the application framework layer further includes a video decoder and a video player. The video decoder invokes a first function to decode video stream data of the third video, and after completing the decoding for the video stream data of the third video, invokes a second function to end the decoding for the video stream data of the third video. The video player is configured to: receive the video stream data of the third video decoded by the video decoder, and send the decoded video stream data of the third video to the layer display control module, to display the decoded video stream data of the third video at the first layer by the layer display module. In addition, the method further includes: determining, based on a function invoked by the video decoder after invoking the first function, the type of the first video playback scenario of the electronic device.

With reference to the first aspect and the foregoing possible implementation, in a possible implementation, the determining, based on a function invoked by the video decoder after invoking the first function, the type of the first video playback scenario of the electronic device includes: in response to that the video decoder invokes a third function after invoking the first function, determining that the first video playback scenario of the electronic device is a first-type video playback scenario; in response to that the video decoder continues to invoke the first function after invoking the second function, determining that the first video playback scenario of the electronic device is a second-type video playback scenario; and in response to that the video decoder does not invoke the first function after invoking the second function, determining that the first video playback scenario of the electronic device is a third-type video playback scenario.

According to a second aspect, an embodiment of this application further provides an electronic device. The electronic device includes: a memory, storing computer program instructions; and a processor, coupled to the memory. When the computer program instructions stored in the memory are executed by the processor, the electronic device is enabled to implement the method according to any one of the first aspect or the possible implementations of the first aspect.

According to a third aspect, an embodiment of this application provides a computer-readable storage medium. The computer-readable storage medium stores a computer program. When the computer program is executed by a processor, the method according to any one of the first aspect or the possible implementations of the first aspect is implemented.

According to a fourth aspect, an embodiment of this application provides a computer program product. When the computer program product runs on an electronic device, the electronic device is enabled to perform the method according to any one of the first aspect or the possible implementations of the first aspect.

It may be understood that, for beneficial effects of the second aspect to the fourth aspect, refer to the relevant description in the first aspect. Details are not described herein again.

BRIEF DESCRIPTION OF THE DRAWINGS

FIG. 11B is a schematic diagram of an interface of the end of playback of a video in a video livestreaming scenario according to an embodiment of this application;

FIG. 11C is a schematic diagram of an interface of prompting a user for a screen-off countdown of a mobile phone in a video livestreaming scenario according to an embodiment of this application;

DETAILED DESCRIPTION OF ILLUSTRATIVE EMBODIMENTS

Figure 1A:
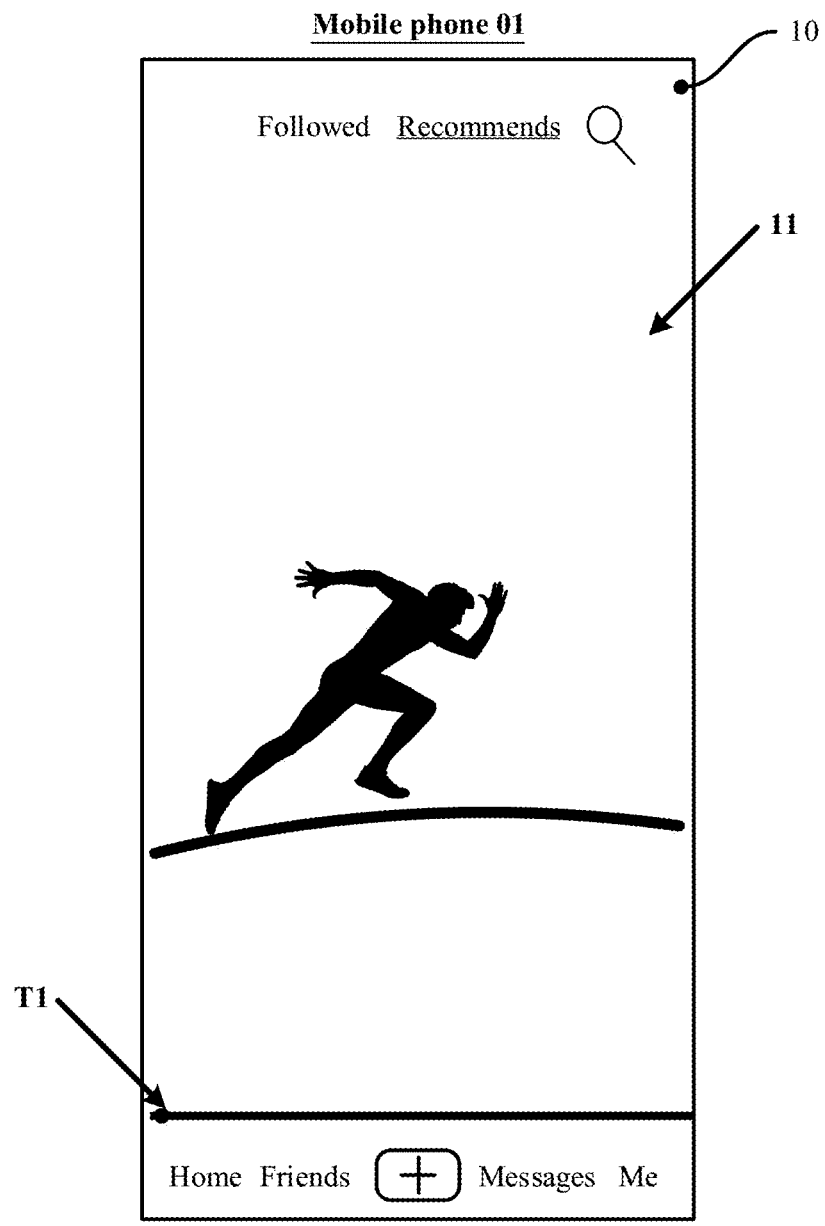
FIG. 1A is a schematic diagram of an interface of the start of playback of a video in a video loop playback scenario according to an embodiment of this application.

Various aspects of illustrative embodiments are described below by using terms commonly used by a person skilled in the art.

This application provides a method for reducing device power consumption, an electronic device, and a medium thereof. Various aspects of illustrative embodiments are described below by using terms commonly used by a person skilled in the art. In descriptions of embodiments of this application, "/" means or, unless otherwise specified. For example, A/B may represent A or B. In this specification, "and/or" describes only an association relationship for describing associated objects and indicates that three relationships may exist. For example, A and/or B may represent the following three cases: Only A exists, both A and B exist, and only B exists. In addition, in the descriptions of embodiments of this application, "a plurality of" means two or more.

The following terms "first", "second", and "third" are merely used for description, and cannot be understood as an indication or implication of relative importance or an implicit indication of a quantity of indicated technical features. Therefore, a feature defined by "first", "second", or "third" may explicitly or implicitly include one or more such features.

The method for reducing device power consumption provided in embodiments of this application may be applied to a terminal device, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, and a personal digital assistant (personal digital assistant, PDA). A specific type of the terminal device is not limited in embodiments of this application. For ease of description, an example in which the terminal device is a mobile phone is still used below.

As described above, many users are accustomed to using a terminal device such as a mobile phone to watch videos provided by video applications such as TikTok® and Kuaishou®. In this case, if the user does not actively turn off the screen, a video in a video application is to be played in loop or until the end of a live stream. During this period, the terminal device such as a mobile phone continuously consume power until the mobile phone is powered off due to low battery.

In addition, when the terminal device such as a mobile phone is placed at a position with poor heat dissipation such as an electric blanket, the foregoing situation may cause an excessively fast temperature rise of the battery of the terminal device such as a mobile phone, leading to abnormal occurrences such as bulge or fire of the battery. This affects the service life of the battery of the mobile phone, and more seriously, personal safety of the user may be endangered.

To resolve the foregoing problems, this application provides a method for reducing device power consumption.

Because video playback scenarios are generally divided into a video loop playback scenario, an automatic video playback scenario, and a video livestreaming scenario, in the video playback scenarios, cases after a user is not watching a video on a mobile phone (or a user has not used a mobile phone for a long period of time) are different.

Figure 1B:
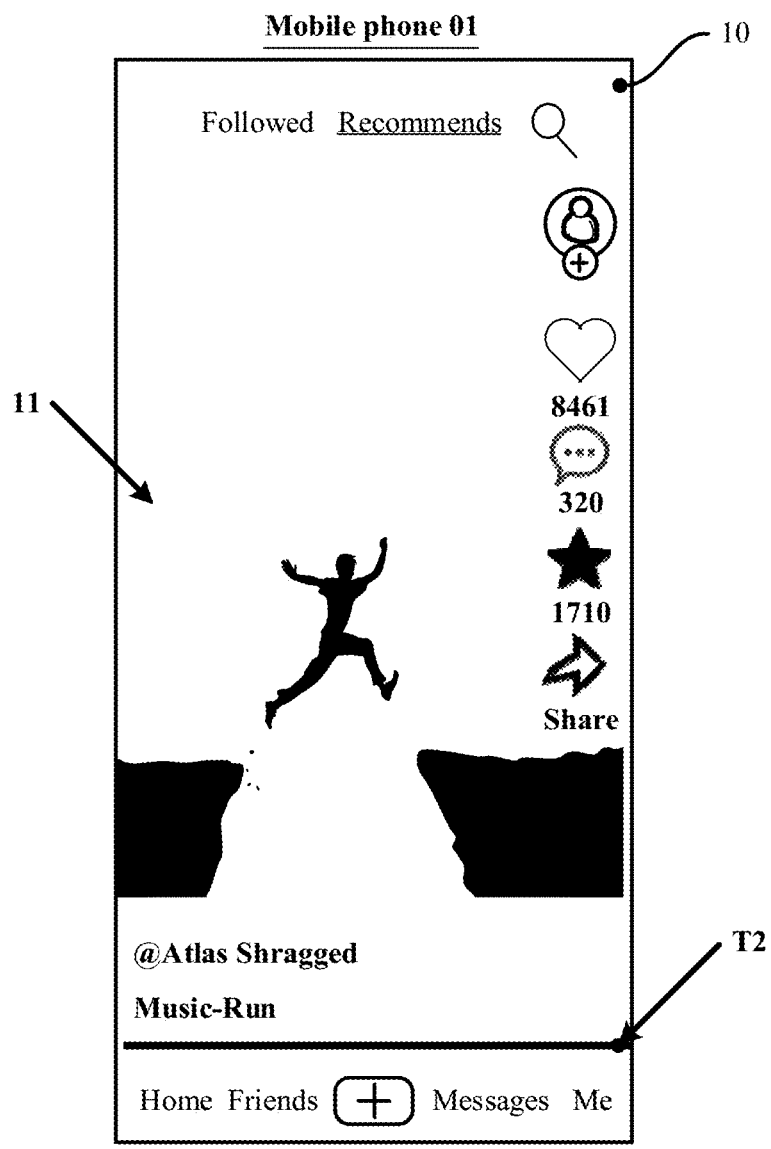
FIG. 1B is a schematic diagram of an interface of the end of playback of a played video in a video loop playback scenario according to an embodiment of this application.
Figure 1C:
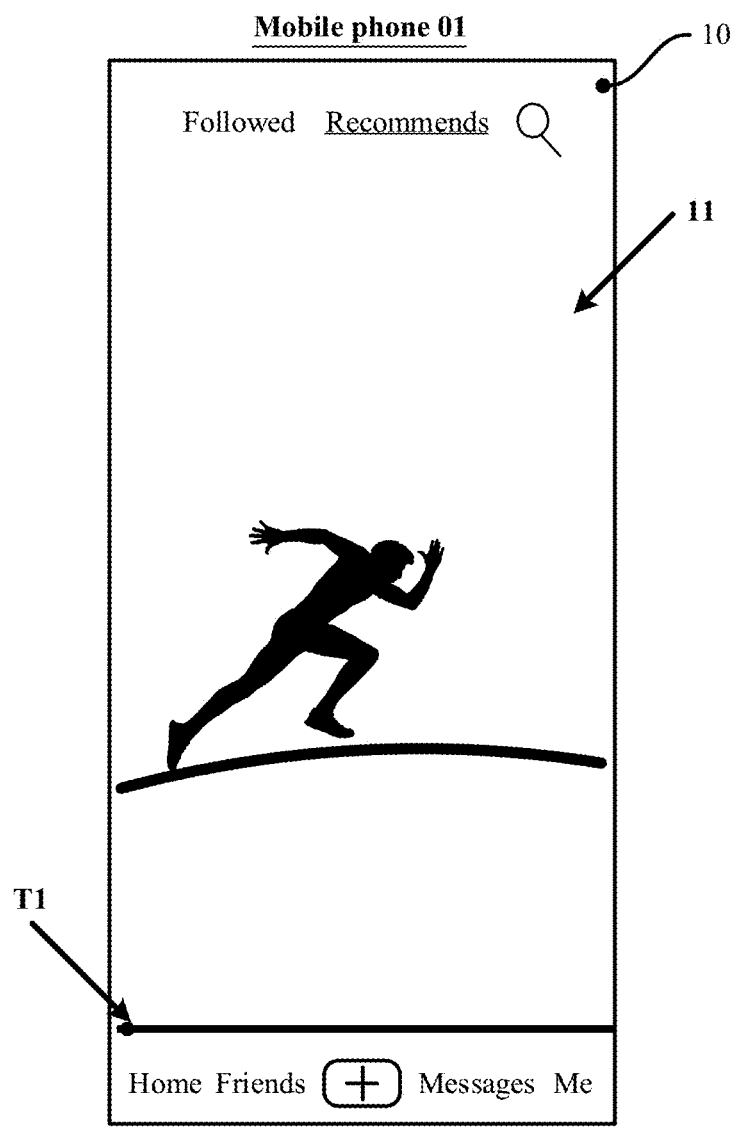
FIG. 1C is a schematic diagram of an interface of the start of playback of a played video again in a video loop playback scenario according to an embodiment of this application.

For example, in some implementations, for the video loop playback scenario, if a user has not used a mobile phone 01 for a long period of time, the mobile phone 01 may automatically play a current video in loop. For example, as shown in FIG. 1A, a video 11 is being played in an interface 10 of the mobile phone 01, and a starting point of a progress bar of the video 11 is T1. As shown in FIG. 1B, if the playback of the video 11 is finished (in which the playback progress bar of the video 11 reaches a T2 moment), the video 11 is played repeatedly on the mobile phone 01. That is, as shown in FIG. 1C, the video 11 is played again (in which the playback progress bar of the video 11 starts from T1).

Figure 2A:
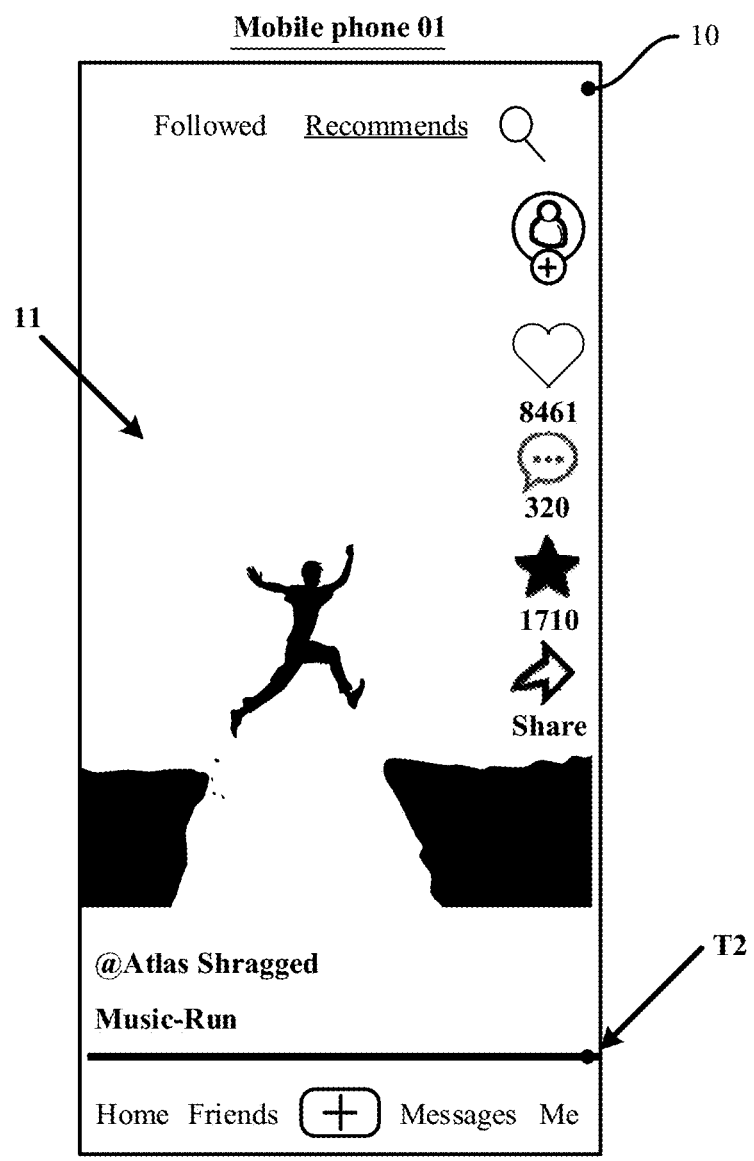
FIG. 2A is a schematic diagram of an interface of the end of playback of a played video in an automatic video playback scenario according to an embodiment of this application.
Figure 2B:
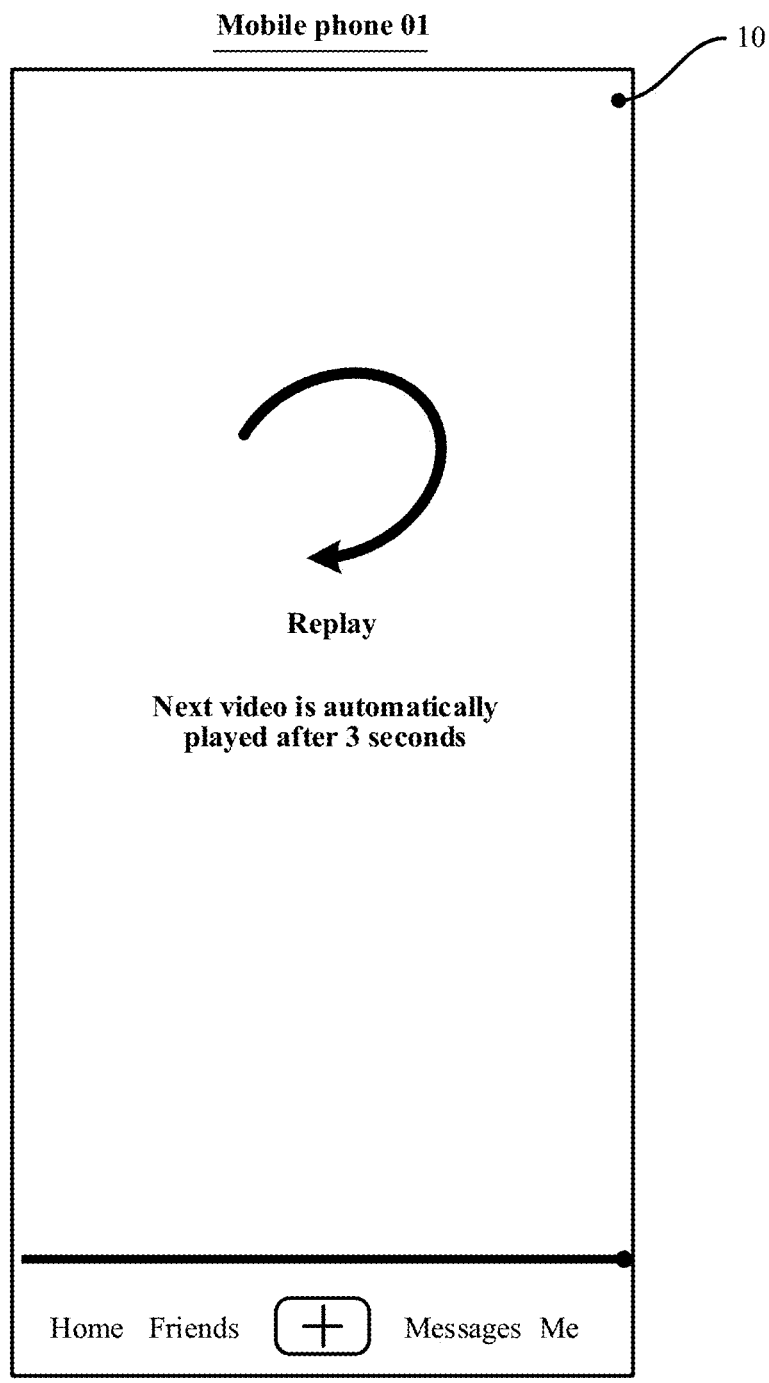
FIG. 2B is a schematic diagram of an interface in an automatic video playback scenario according to an embodiment of this application.
Figure 2C:
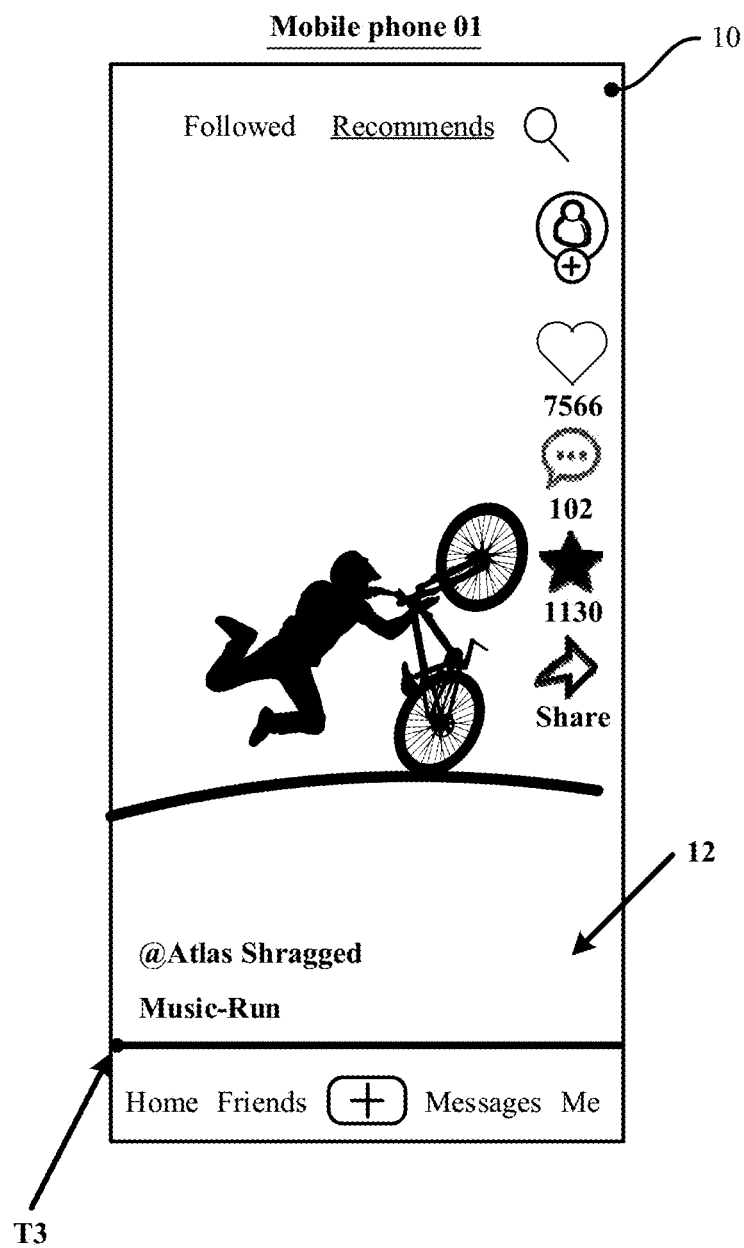
FIG. 2C is a schematic diagram of an interface of video playback in a video loop playback scenario according to an embodiment of this application.

In some implementations, for the automatic video playback scenario, if a user has not used a mobile phone 01 for a long period of time, after playback of a current video is finished in the automatic video playback scenario, a next video is automatically played. For example, as shown in FIG. 2A, after playback of a video 11 is finished in an interface 10 of the mobile phone 01, a playback progress bar of the video 11 reaches a T1 moment. After an interval of preset duration (for example, 3s as shown in FIG. 2B), as shown in FIG. 2C, a next video 12 is automatically played by the mobile phone 01, and in this case, a playback progress bar of the video 12 starts from a T3 moment.

Figure 3B:
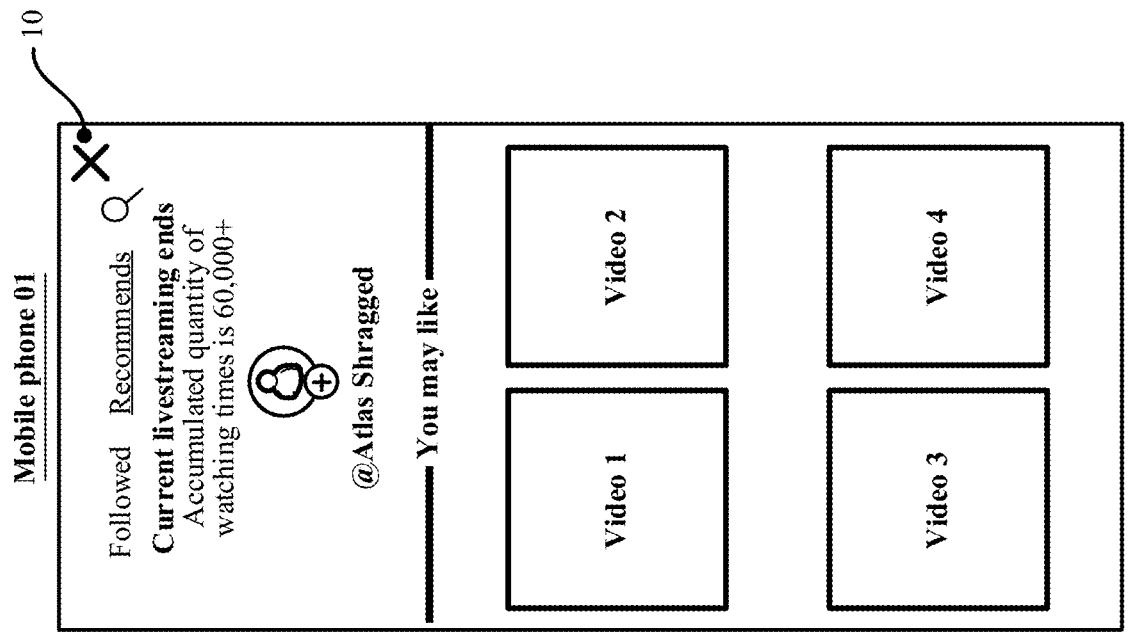
FIG. 3B is a schematic diagram of an interface after the end of a video in a video livestreaming scenario according to an embodiment of this application.
Figure 3A:
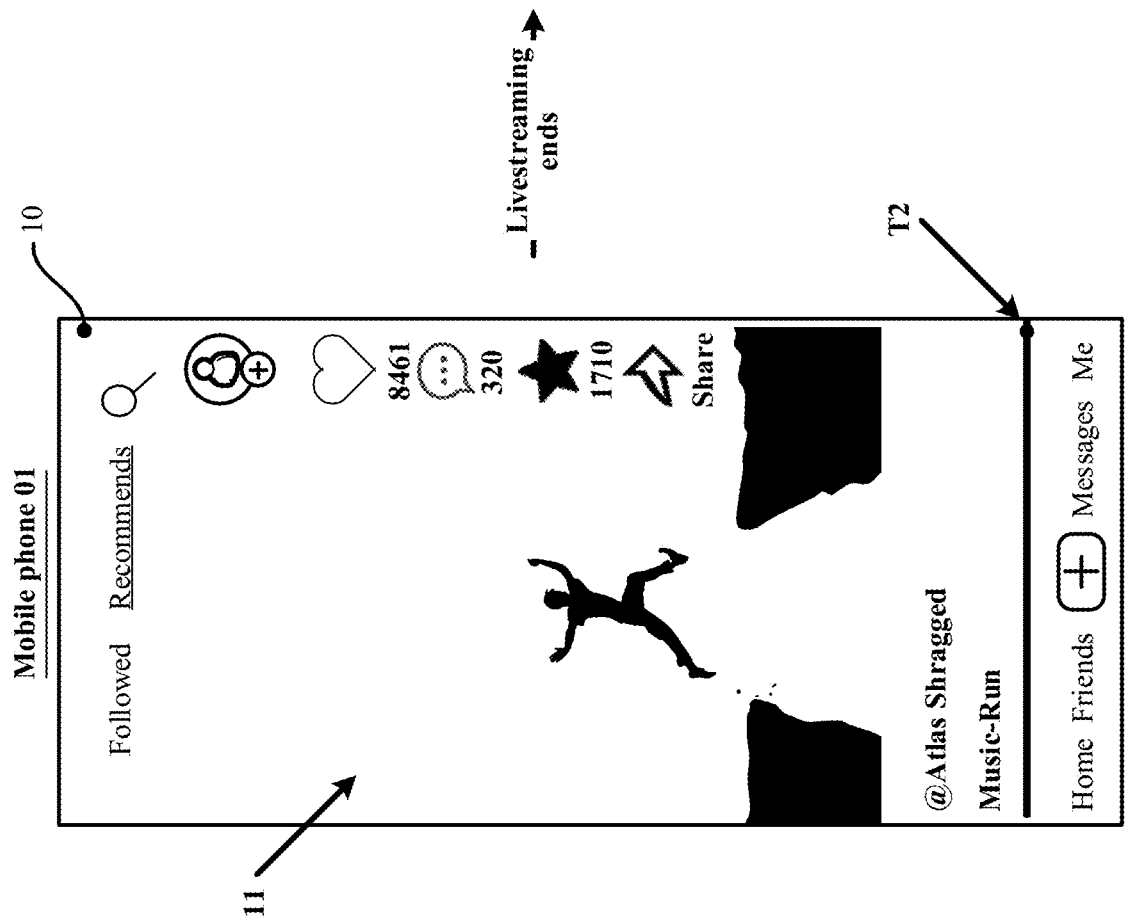
FIG. 3A is a schematic diagram of an interface of video playback in a video livestreaming scenario according to an embodiment of this application.

In some implementations, for the video livestreaming scenario, if a user has not used a mobile phone 01 for a long period of time, after current livestreaming ends, the mobile phone 01 may enter and remain in a livestreaming end state. For example, as shown in FIG. 3A, after playback of a video 11 is finished in an interface 10 of the mobile phone 01, a progress bar of the video 11 reaches a T1 moment. Then, as shown in FIG. 3B, the interface 10 is displayed as an interface indicating that livestreaming ends, and specifically displays an accumulated quantity of watching times of the live video (for example, "accumulated quantity of watching times is 60,000+") and a livestreaming state (for example, "current livestreaming ends").

In view of this, according to the method in this application, the foregoing different video playback scenarios are identified, whether a user is still watching a video in a current video playback scenario is determined in different video playback scenarios, and the method for reducing device power consumption is performed when it is determined that the user is not watching the video.

For example, when a mobile phone 01 determines that the user is in a sleep state, the mobile phone 01 automatically turns off the screen, automatically switches into a power saving mode, or the like. A method for identifying different video playback scenarios by the mobile phone 01 and a specific method for reducing device power consumption are described below.

Specifically, in a screen-on state, if the mobile phone 01 determines that a current video playback scenario is a video loop playback scenario, the mobile phone 01 continues to determine whether a quantity of loop playbacks of a video exceeds a first threshold and/or whether duration of loop playback of a current video exceeds first preset duration.

When it is determined that the quantity of loop playbacks of the video exceeds the first threshold and/or the duration of loop playback of the current video exceeds the first preset duration, the mobile phone 01 performs the method for reducing device power consumption. The first threshold and the first preset duration are empirical values or experimental values. This is not limited in this application.

If the mobile phone 01 determines that a current video playback scenario is an automatic video playback scenario, the mobile phone 01 continues to determine whether a quantity of automatic playbacks of video exceeds a second threshold and/or whether duration in which the mobile phone 01 plays videos exceeds second preset duration. When it is determined that the quantity of automatic playbacks of the videos exceeds the second threshold and/or the duration in which the mobile phone 01 plays the videos exceeds the second preset duration, the mobile phone 01 performs the method for reducing device power consumption. The second threshold and the second preset duration are empirical values or experimental values. This is not limited in this application.

If the mobile phone 01 determines that a video playback scenario is a video livestreaming scenario, the mobile phone 01 continues to determine whether no first preset operation performed by a user is detected for more than third preset duration after video livestreaming ends. When it is determined that duration in which no first preset operation performed by the user is detected exceeds the third preset duration, the method for reducing device power consumption is performed. The third preset duration is an empirical value or an experimental value. This is not limited in this application.

In this way, whether a user is still watching a video on the mobile phone 01 can be pertinently determined based on a current video playback scenario, and the method for reducing device power consumption is performed when it is determined that the user is not watching the video on the mobile phone 01, to reduce power consumption of the mobile phone 01.

In addition, it may be understood that when the user is not watching a video on the mobile phone 01, the mobile phone 01 is timely controlled to reduce the power consumption, facilitating protection of a battery of the mobile phone 01, and preventing occurrences such as bulge or fire due to an excessively fast temperature rise of the battery of the mobile phone 01. This is more conductive to personal safety of the user.

Figure 4:
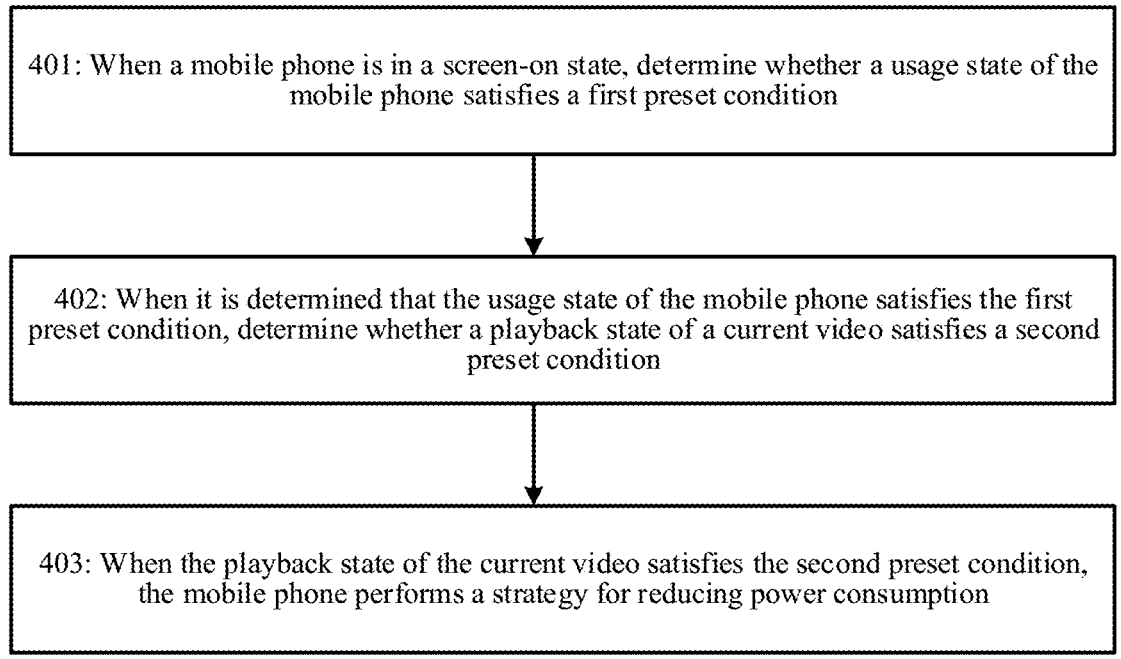
FIG. 4 is a schematic flowchart of a method in this application according to an embodiment of this application.

To have a clearer understanding of an implementation process of this application, a process of implementing the solution of this application by mobile phone 01 is described below with reference to FIG. 1. As shown in FIG. 4, the method includes the following steps.

401: When the mobile phone 01 is in a screen-on state, determine whether a usage state of the mobile phone 01 satisfies a first preset condition.

It may be understood that the precondition for identifying a video playback state in the foregoing various video playback scenarios is that the mobile phone 01 is in the screen-on state.

In view of this, in some implementations, the mobile phone 01 may determine, by determining whether an interaction state between the mobile phone 01 and a user satisfies a corresponding condition, whether the user has not interacted with the mobile phone 01 for a long period of time, to further determine whether to perform the method for reducing power consumption.

Figure 5:
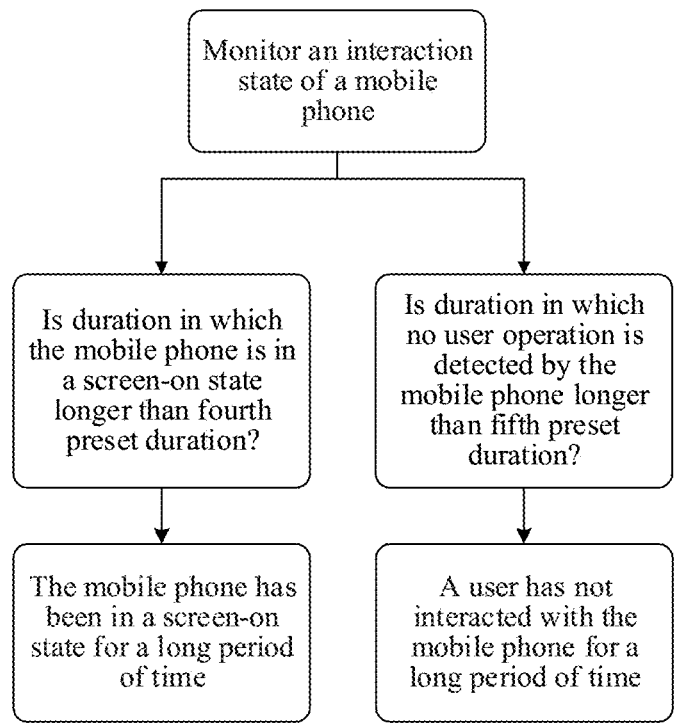
FIG. 5 is a schematic diagram of several cases of monitoring an interaction state of a mobile phone according to an embodiment of this application.

More specifically, it may be understood that in general, during using of the mobile phone 01 by the user, the mobile phone 01 inevitably enters a screen-off state due to situations such as the user locking the screen for temporarily going out. Therefore, the mobile phone 01 may not be in the screen-on state for a long period of time. If the mobile phone 01 has been in the screen-on state for a long period of time, it may indicate that the user has not used the mobile phone 01 for a long period of time. Therefore, as shown in FIG. 5, in some implementations, whether the user has not interacted with the mobile phone 01 for a long period of time may be determined through determining whether the mobile phone 01 has been in the screen-on state for a long period of time. More specifically, in some implementations, whether the mobile phone 01 has been in the screen-on state for a long period of time may be determined by determining whether duration in which the mobile phone 01 is in the screen-on state is longer than fourth preset duration. If the duration in which the mobile phone 01 is in the screen-on state is longer than the fourth preset duration, it is determined that the mobile phone 01 has been in the screen-on state for a long period of time. The fourth preset duration is an empirical value or an experimental value, for example, may be 10 minutes. This is not limited in this application.

Similarly, it may be understood that in general, during the interaction between the user and the mobile phone 01, a user operation can often be detected by the mobile phone 01. Therefore, if no operation by the user is detected by the mobile phone 01 for a long period of time, it may also be determined that the user has not used the mobile phone 01 for a long period of time. Therefore, as shown in FIG. 5, in some implementations, the mobile phone 01 may alternatively determine, by determining whether duration in which no user operation is detected by the mobile phone 01 is longer than fifth preset duration, whether the user has not interacted with mobile phone 01 for a long period of time. If it is determined that the duration in which no user operation is detected by the mobile phone 01 is longer than the fifth preset duration, it is determined that the user has not interacted with mobile phone 01 for a long period of time. The fifth preset duration is an empirical value or an experimental value, for example, may be 15 minutes. This is not limited in this application.

It may be understood that in some implementations, the interaction between the user and the mobile phone 01 includes but is not limited to interaction behaviors such as the user touching the screen of the mobile phone 01 and the user inputting a voice instruction to the mobile phone 01. In some implementations, the mobile phone 01 may detect, by using a terminal interaction detection method, whether the user interacts with the mobile phone 01. Specifically, the mobile phone 01 may determine, by using an event input module InputEvent at an application framework layer of the mobile phone 01, whether a touch event such as touch, tap/click, and touch and hold is detected, to determine whether the user interacts with mobile phone 01. In some implementations, the mobile phone 01 may detect voice interaction between the user and a terminal by using a voice recognition engine of the mobile phone 01. It should be understood that a method for detecting the interaction between the user and the mobile phone 01 is a technical means commonly known to a person skilled in the art. This is not limited in this application.

It may be understood that it may be determined that the user has not used the mobile phone 01 for a long period of time, provided that the usage state of the mobile phone 01 satisfies one of the foregoing cases. It may also be understood that in some implementations, whether the user has not used the mobile phone 01 for a long period of time may be determined with reference to the foregoing two circumstances. To be specific, if it is detected that mobile phone 01 has been in the screen-on state for a long period of time and that the user has not interacted with the mobile phone 01 for a long period of time, it is determined that the user has not used the mobile phone 01 for a long period of time.

Figure 6:
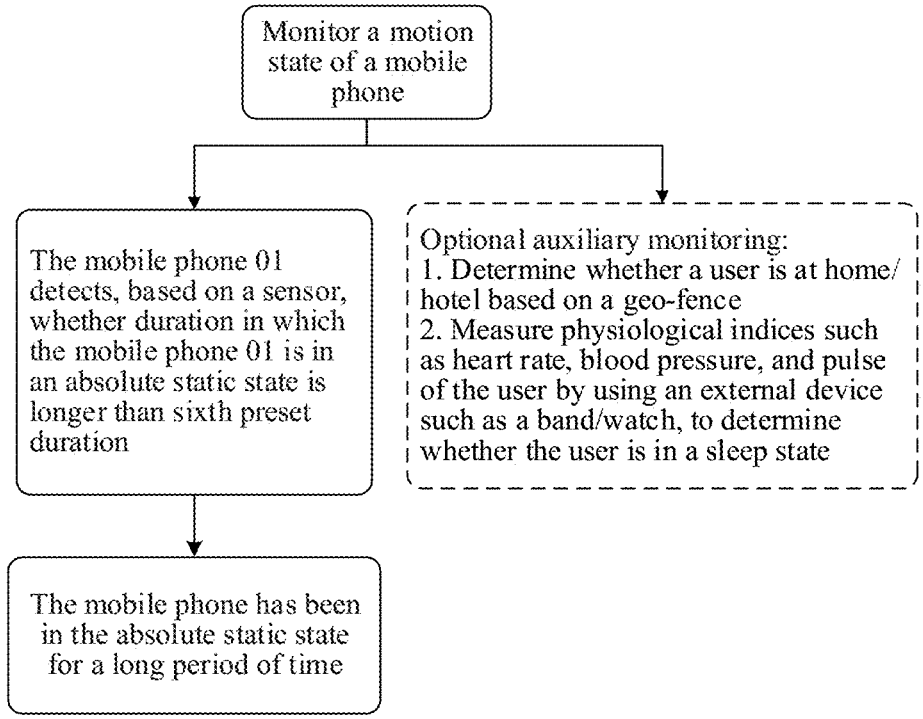
FIG. 6 is a schematic diagram of several cases of monitoring a motion state of a mobile phone according to an embodiment of this application.

In addition, it may be understood that there are scenarios where the user watches a video through the mobile phone 01 but does not have any interaction with mobile phone 01. In this case, because the mobile phone 01 is generally not in an absolute static state, in some other implementations, as shown in FIG. 6, the mobile phone 01 may alternatively determine, by determining whether a motion state of the mobile phone 01 satisfies a corresponding condition, whether the user is using the mobile phone 01.

For example, motion data of the mobile phone 01 may be collected by using various sensors in the mobile phone 01, such as a gyroscope sensor and an acceleration sensor, to determine that the mobile phone 01 is in an absolute static state. If duration in which the mobile phone 01 is in the absolute static state is longer than sixth preset duration, it indicates that the user is not using mobile phone 01. The sixth preset duration is an empirical value or an experimental value. This is not limited in this application. In addition, determining whether the mobile phone 01 is in an absolute static state based on the sensor data of the mobile phone 01 is a technical means commonly known to a person skilled in the art. This is not limited in this application.

In some other implementations, the mobile phone 01 may determine, by determining whether the user is in a sleep state, whether the user is using the mobile phone 01. It may be understood that users tend to have a long sleep at places, for example, at home or hotels. Therefore, in some implementations, the mobile phone 01 may further determine, based on a positioning function of the mobile phone 01, whether the mobile phone 01 is within a preset geo-fence. When it is determined that the mobile phone 01 is within the preset geo-fence, whether the user is in a sleep state continues to be determine. If it is determined that the user is in the sleep state, it indicates that the user is not using the mobile phone 01. In some implementations, the positioning function of the mobile phone 01 may be implemented by the mobile phone 01 using a built-in LinkTurbo service, may be implemented by the mobile phone 01 using a third-party platform (such as a global positioning system), or the like. This is not limited in this application.

In some implementations, the mobile phone 01 may alternatively use a smart wearable device such as a smart band, a smartwatch, or a smart ring worn by the user to obtain physiological data of the user, such as heart rate data, blood pressure data, and pulse data, and then, whether the user is in the sleep state is determined based on these physiological data, to improve accuracy of detecting the usage state of the mobile phone 01 in the method of this application.

An example in which detection data of a smartwatch is used. When the smartwatch detects that the user is in a motion state, for example, a step count of the user is increasing, it may be determined that the user is in a non-absolute static state, and then it may be determined that the user is not sleeping. It may be understood that the smart wearable device such as a smart band may be in communication connection with the mobile phone 01 in a wireless transmission manner such as Bluetooth or a wireless network. In addition, in a specific determining process, the physiological data of the user may be sent to the mobile phone 01 by the smart wearable device, and the mobile phone 01 determines, based on the physiological data of the user, whether the user is in the sleep state. Alternatively, the smart wearable device may determine, based on the physiological data of the user, whether the user is in the sleep state, and then send a determining result to the mobile phone 01. This is not limited in this application.

In some implementations, before detecting whether the user is in the sleep state by using the smart wearable device such as a smartwatch, the mobile phone 01 may first perform wear detection on the smart wearable device such as the smartwatch. After determining that the user is wearing the smart wearable device, data from the smart wearable device such as the smartwatch is used to determine whether the user is in the sleep state. In some implementations, if detection data about the user of the smart wearable device such as the smartwatch is null, for example, values of the blood pressure and the heart rate of the user measured by the smartwatch are both o, it may alternatively be determined that the user is not wearing the smartwatch. In this case, the smartwatch is not used to determine whether the user is in the sleep state. A method for determining whether a user is in a sleep state by using a smart band, a smartwatch, a smart ring, or the like is a means commonly known to a person skilled in the art, and is not described herein in this application.

402: When it is determined that the usage state of the mobile phone 01 satisfies the first preset condition, determine a playback state of a current video.

In some implementations, when it is determined that the user has not interacted with the mobile phone 01 for a long period of time, a playback state of a video currently played by the mobile phone 01 is further determined, and then whether to perform the method for reducing power consumption is determined based on the playback state of the current video on the mobile phone 01.

In addition, as described above, the video playback scenario may be classified into three types: a video loop playback scenario, an automatic video playback scenario, and a video livestreaming scenario. Playback states corresponding to videos are different when the user is not watching the video.

In view of this, as described above, in some implementations, a current video playback scenario of the mobile phone 01 may be determined, and after the current video playback scenario of the mobile phone 01 is determined, whether to perform the method for reducing power consumption is further determined by determining whether a video playback state satisfies a second preset condition in the current video playback scenario. A method for determining a video playback scenario of the mobile phone 01 is described below.

Figure 7:
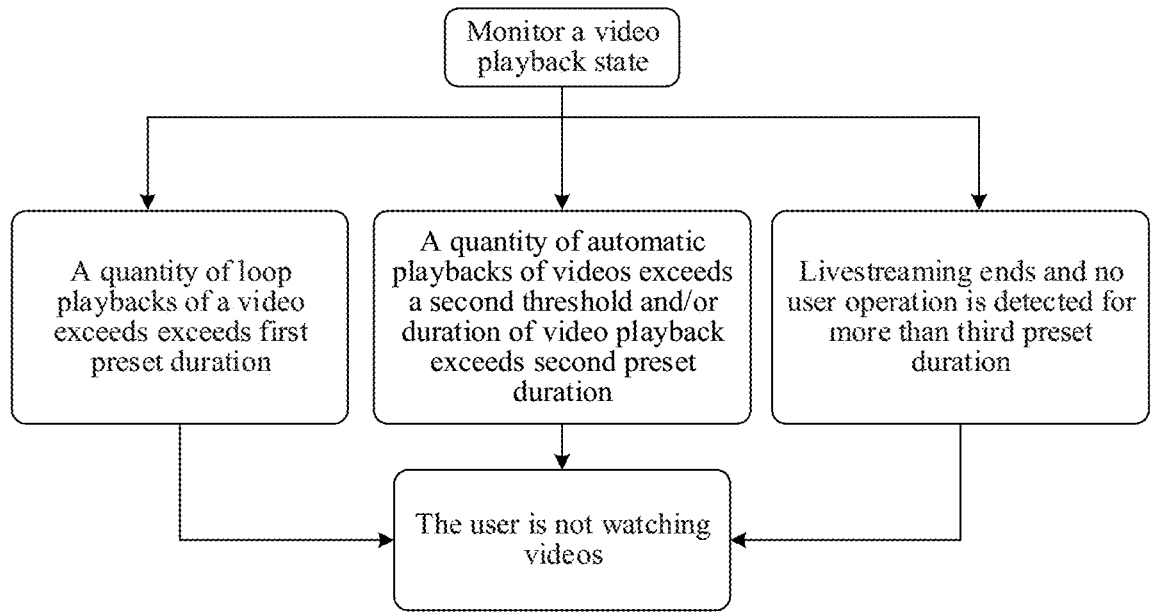
FIG. 7 is a schematic diagram of several cases of monitoring a video playback state according to an embodiment of this application.

Specifically, as shown in FIG. 7, in some implementations, the mobile phone 01 determines that a current video playback scenario is a video loop playback scenario, and when it is detected that a quantity of playbacks of a current video exceeds a first threshold, it is determined that a current video playback state satisfies the second preset condition. The first threshold is an empirical value or an experimental value. For example, the first threshold may be 10. This is not limited in this application.

In some other implementations, the mobile phone 01 determines that a current video playback scenario is a video loop playback scenario, and when it is detected that duration in which a current video is played exceeds first preset duration, it is determined that a current video playback state satisfies the second preset condition. The first preset duration is an empirical value or an experimental value. For example, the first preset duration may be 10 minutes. This is not limited in this application.

In some additional implementations, when determining that a current video playback scenario is a video loop playback scenario and detecting that duration in which a current video is played exceeds first preset duration and that a quantity of playbacks of the current video exceeds a first threshold, the mobile phone 01 may alternatively determine that a current video playback state satisfies the second preset condition. This is not limited in this application. A manner for determining a quantity of loop playbacks and playback time in a video loop playback scenario is described below.

Still as shown in FIG. 7, in some implementations, the mobile phone 01 determines that a current video playback scenario is an automatic video playback scenario, and when it is detected a quantity of automatic playbacks during playing videos exceeds a second threshold, it is determined that a current video playback state satisfies the second preset condition. The second threshold is an empirical value or an experimental value. For example, the second threshold may be 5.

In some implementations, the mobile phone 01 determines that a current video playback scenario is an automatic video playback scenario, and it is detected that video playback time exceeds second preset duration, it is determined that a current video playback state satisfies the second preset condition.

In some implementations, when determining that a current video playback scenario is an automatic video playback scenario and detecting that duration in which a current video is played exceeds second preset duration and that a quantity of automatic playbacks exceeds a second threshold, the mobile phone 01 may alternatively determine that a current video playback state satisfies the second preset condition. This is not limited in this application. A manner for determining a quantity of automatic playbacks and playback time in an automatic video playback scenario is described below.

Still as shown in FIG. 7, in some additional implementations, the mobile phone 01 determines that a current video playback scenario is a video livestreaming scenario and detects that the video livestreaming scenario ends. When duration in which no user operation is detected exceeds third preset duration after the video livestreaming scenario ends, it is determined that a current video playback state of the mobile phone 01 satisfies the second preset condition. The third preset duration is an empirical value or an experimental value, for example, may be five minutes. This may be limited in this application. A manner for determining that livestreaming ends in a video livestreaming scenario is described below.

Figure 8:
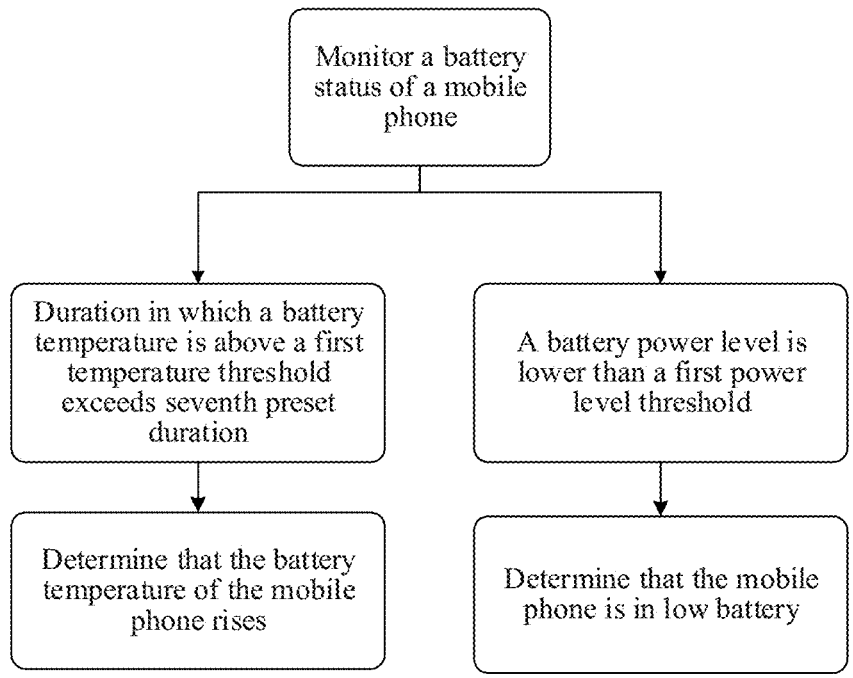
FIG. 8 is a schematic diagram of several cases of monitoring a battery power level of a mobile phone according to an embodiment of this application.

In some implementations, whether a video playback state of the mobile phone 01 satisfies the second preset condition may alternatively be determined based on current battery usage of the mobile phone 01. Specifically, for example, as shown in FIG. 8, if it is detected that a current battery power level of the mobile phone 01 is lower than the first power level threshold, it is determined that a video playback state of the mobile phone 01 satisfies the second preset condition. For another example, if it is detected that duration in which battery temperature of the mobile phone 01 is above a first temperature threshold exceeds seventh preset duration, it indicates that the battery temperature of the mobile phone 01 is in a continuously rising state, and it may alternatively be determined that the video playback state of the mobile phone 01 satisfies the second preset condition. This is not limited in this application.

In some implementations, the battery usage of the mobile phone 01 may be obtained by the mobile phone 01 based on a power monitoring function and a temperature monitoring function of a battery management module of the mobile phone 01. It may be understood that a method for obtaining battery usage of the mobile phone 01 by the mobile phone 01 is a means commonly known to a person skilled in the art. This is not limited in this application.

It should be understood that the foregoing manners for determining whether the current video playback state of the mobile phone 01 satisfies the second preset condition may be implemented independently or in combination. This is not limited in this application.

In addition, it may be understood that in some implementations, priorities may be set for the determining manners. Then, if a determining manner having the highest priority is satisfied, it is determined that the current video playback state of the mobile phone 01 satisfies the second preset condition, and if a determining manner having the highest priority is not satisfied, determining conditions corresponding to other priorities are sequentially determined. The priorities of the determining condition are not limited in this application. For example, low battery of the mobile phone 01 or a continuous increase in the battery temperature of the mobile phone 01 may affect service time of the mobile phone 01, or even as described above, may affect service life of a battery of the mobile phone 01. Therefore, a priority of determining, based on the current battery usage of the mobile phone 01, whether the video playback state of the mobile phone 01 satisfies the second preset condition may be set as the highest priority. When it is detected that the battery power level of the mobile phone 01 is lower than the foregoing first power level threshold or the battery temperature of the mobile phone 01 is above the first temperature threshold for more than the seventh preset duration, it may be determined that the mobile phone 01 satisfies the second preset condition. Otherwise, whether the current video playback state of the mobile phone 01 satisfies the second preset condition is continuously determined based on other determining conditions. The first power level threshold is an empirical value or an experimental value. For example, the first power level threshold may be 5%. The first temperature threshold may also be an empirical value or an experimental value. For example, the first temperature threshold may be 35° C. The seventh preset duration is also an empirical value or an experimental value. For example, the seventh preset duration may be 30 minutes.

In some implementations, values of the foregoing thresholds in the method for determining whether the current video playback state of the mobile phone 01 satisfies the second preset condition may alternatively be set based on the current battery usage of the mobile phone 01. For example, if the battery power level of the mobile phone 01 is higher than the first power level threshold but lower than a second power level threshold, a value of the foregoing threshold may decrease. For example, the first threshold may decrease from 10 to 5. The second power level threshold is an empirical value or an experimental value. For example, the second power level threshold may be 15%. For another example, if the battery temperature of the mobile phone 01 is below the first temperature threshold but above a second temperature threshold, the foregoing threshold may alternatively decrease. For example, the second threshold may decrease from 7 to 3. The second temperature threshold may also be an empirical value or an experimental value. For example, the second temperature threshold may be 30° C. This is not limited in this application. It may be understood that the foregoing decreasing magnitudes of the first threshold and the second threshold are examples and do not constitute any limitation on this application, and in other implementations, other thresholds may decrease by other magnitudes. This is not limited in this application.

403: When the current video playback state satisfies the second preset condition, the mobile phone 01 performs the method for reducing power consumption.

To be specific, when the mobile phone 01 determines that a playback state of a video played by the mobile phone 01 satisfies the second preset condition in the foregoing different video playback scenarios, the mobile phone 01 performs the method for reducing power consumption, to reduce power consumption of the mobile phone 01 and further prevent occurrences such as bulge, heat generation, and the like of the battery of the mobile phone 01 when the mobile phone 1 is placed in an unsafe place such as an electric blanket, thereby improving service life of the battery of the mobile phone 01, improving user experience, and ensuring personal safety of a user.

Figure 9:
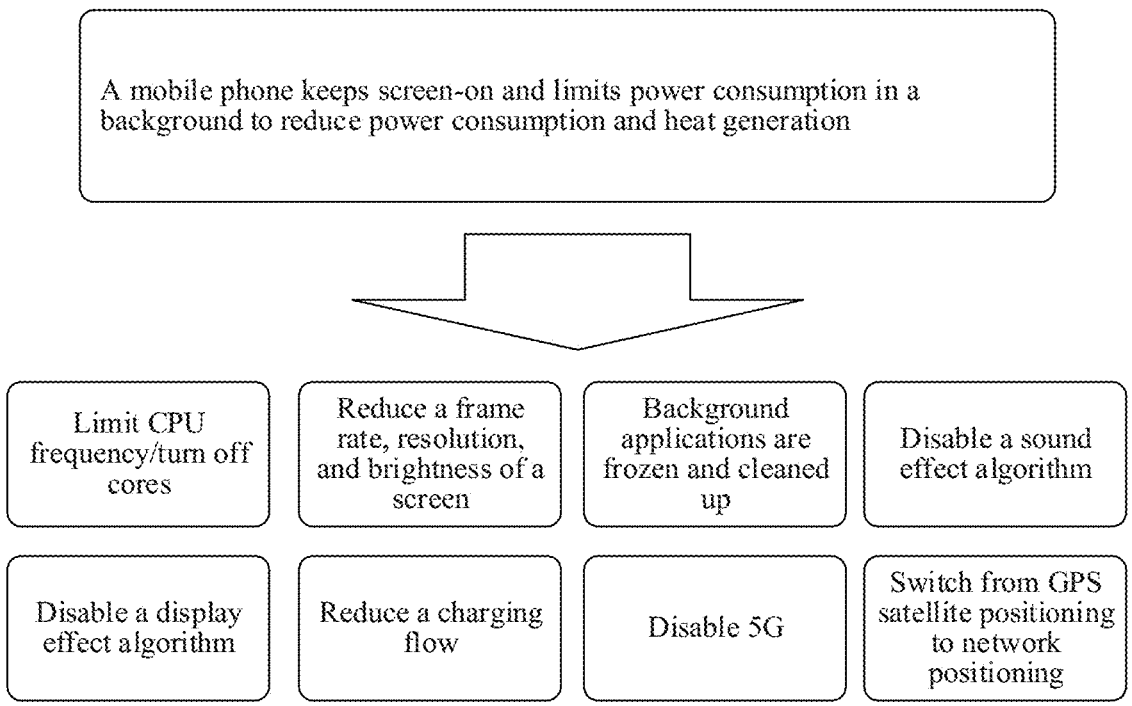
FIG. 9 is a schematic diagram of several operations of reducing power consumption of a device according to an embodiment of this application.

In some implementations, as shown in FIG. 9, the method for reducing power consumption includes keeping the mobile phone 01 in a screen-on state but limiting power consumption in a background of the mobile phone 01 to reduce the power consumption of the mobile phone 01 and heat generated by the battery.

Specifically, in some implementations, the mobile phone 01 may limit an operational performance of a central processing unit (central unit processor, CPU) of the mobile phone 01. For example, an operating frequency of the CPU is limited (for example, an operating frequency of the CPU is limited from 3.4 GHz to 2 GHz), or several cores such as a large core/a super core are forcibly turned off, to reduce the power consumption of the mobile phone 01. For example, assuming that the CPU of the mobile phone 01 has eight cores (including four large cores and four small cores), and during reduction of the device power consumption of the mobile phone 01, the four large cores may be turned off to reduce the power consumption of the mobile phone 01. In some other implementations, the mobile phone 01 may reduce a frame rate and resolution of a video currently played by the mobile phone 01 (for example, the foregoing video loop playback scenario or automatic video playback scenario), or reduce current brightness or the like of the screen of the mobile phone 01, to reduce the power consumption of the mobile phone 01.

For example, a frame rate of a video currently played by the mobile phone 01 (for example, the foregoing video loop playback scenario or automatic video playback scenario) is reduced from 240 frames per second (frame per second, FPS) to 60 FPS. Alternatively, for example, resolution of a video currently played is reduced from 1080p (progressive scanning) to 720p (progressive scanning).

In some implementations, the mobile phone 01 may alternatively suspend some or all of currently running background applications. For example, updates of all or some of applications in the background are suspended.

In some implementations, the mobile phone 01 may disable a sound effect algorithm for a video currently played by the mobile phone 01. For example, the mobile phone 01 may disable a sound effect algorithm such as a Dolby® sound effect and a three-dimensional stereo surround sound effect used during video playback.

In some implementations, the mobile phone 01 may disable a display effect algorithm for a video currently played by the mobile phone 01. For example, a definition algorithm used during video playback is disabled.

In some implementations, when it is detected that the mobile phone 01 is in a charging state, the mobile phone 01 may alternatively limit a maximum current for charging the mobile phone 01, to reduce heat generated by the battery of the mobile phone 01. For example, the mobile phone 01 may reduce a charging current of the mobile phone 01 from 400 milliamperes to 200 milliamperes.

In some implementations, the mobile phone 01 may alternatively disable 5G signals. In some implementations, the mobile phone 01 switches a used positioning mode to a mode that consumes less power. For example, the mobile phone 01 switches from a global positioning system (global positioning system, GPS) mode to a network positioning mode.

Figure 10:
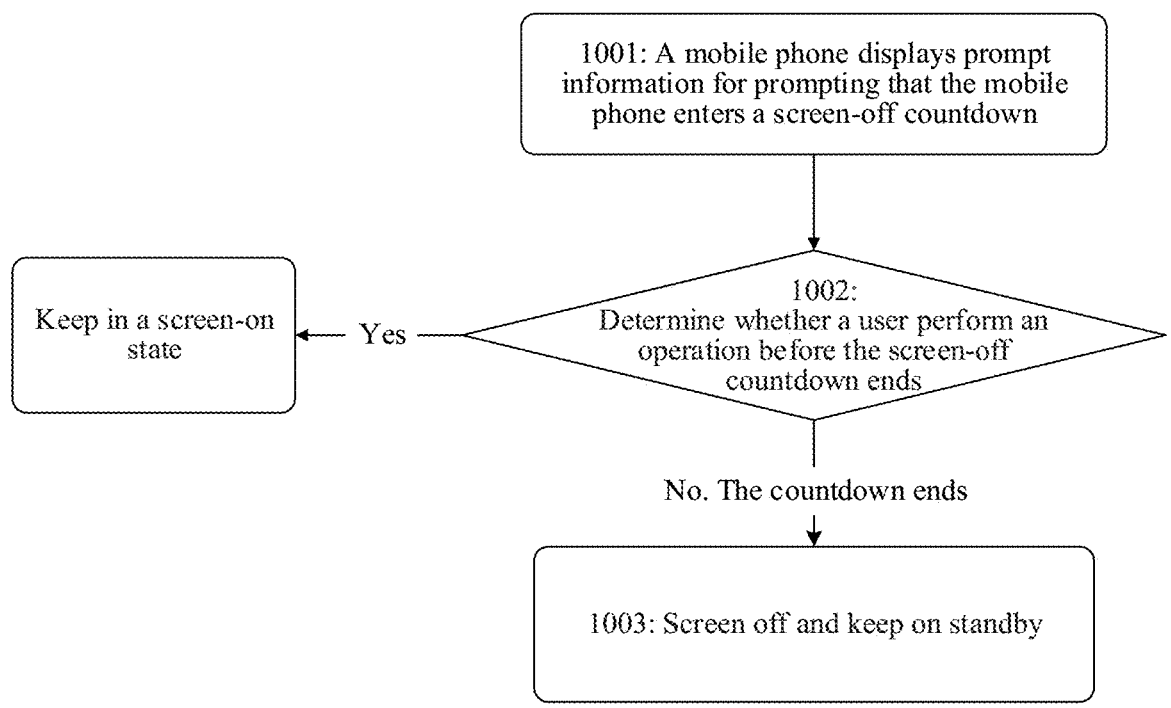
FIG. 10 is a schematic flowchart of a method for reducing device power consumption according to an embodiment of this application.

In some other implementations, as shown in FIG. 10, the method for reducing power consumption includes: 1001: The mobile phone 01 prompts a user that the mobile phone 01 enters a screen-off countdown. 1002: The same mobile phone 01 detects whether the user perform a preset operation during the screen-off countdown. If it is detected that the user performs the preset operation during the foregoing screen-off countdown, 1003 is performed. To be specific, the mobile phone 01 controls the mobile phone 01 to turn off the screen. If no preset operation performed by the user is detected during the screen-off countdown, the mobile phone 01 keeps in a screen-on state. The user performing the preset operation being detected includes a gesture operation such as the user tapping or touching and holding the screen being detected or the user making a preset voice instruction being detected. This is not limited in this application.

Figure 11A:
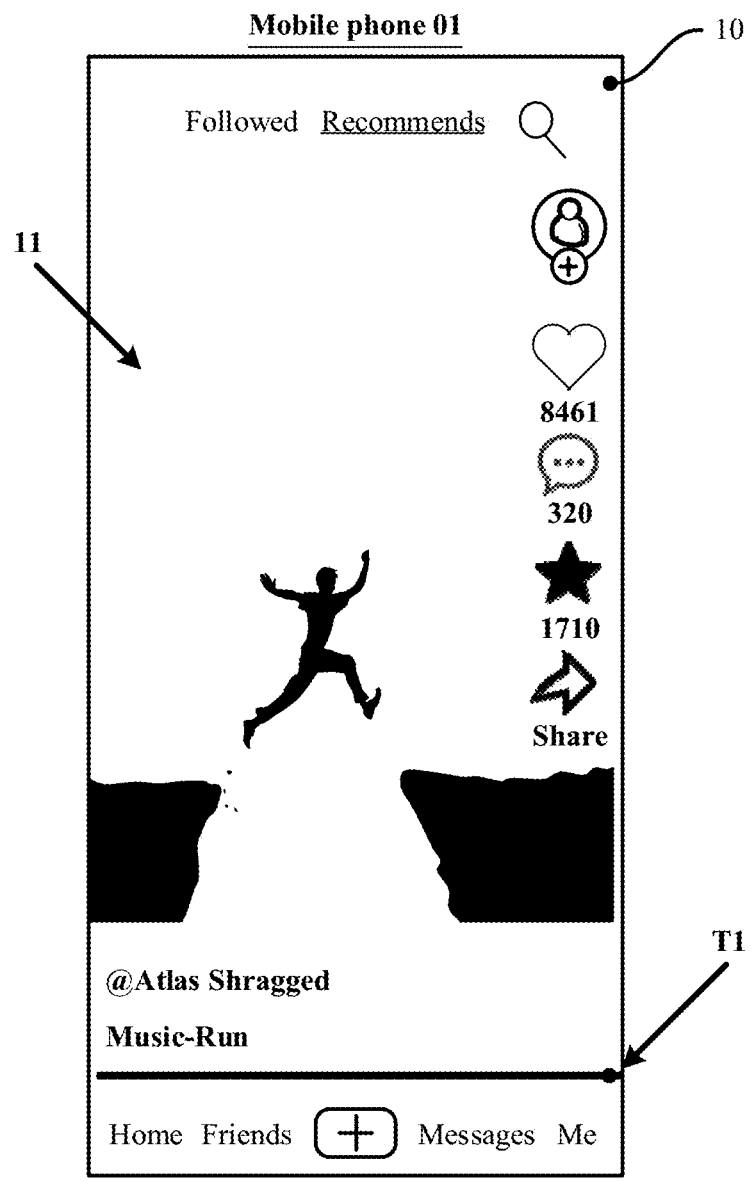
FIG. 11A is a schematic diagram of an interface of video playback in a video livestreaming scenario according to an embodiment of this application.

For example, as shown in FIG. 11A, the mobile phone 01 is currently in a video livestreaming scenario, and as shown in FIG. 11B, the mobile phone 01 detects that a video 11 has been in a livestreaming end state for more than third preset duration. In this case, as shown in FIG. 11C, an interface 10 of the mobile phone 01 displays a screen-off countdown prompt box 101 to prompt the user that "no operation is detected for a long period of time and screen of the phone is to be off automatically after 1 minute", and a countdown time prompt 1012 is displayed simultaneously.

Figure 11D:
FIG. 11D is a schematic diagram of a screen of a mobile phone being turned off in a video livestreaming scenario according to an embodiment of this application.
Figure 11E:
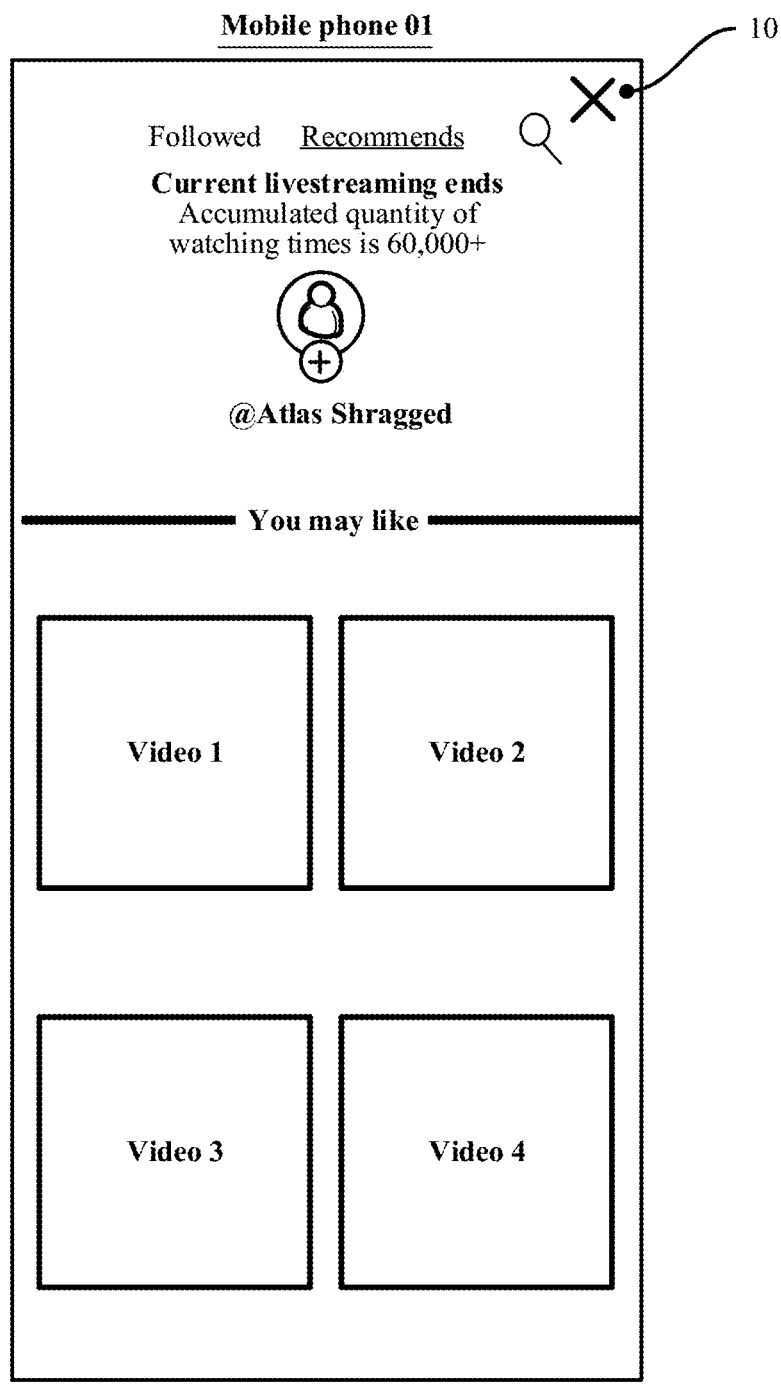
FIG. 11E is a schematic diagram of an interface of a mobile phone after cancellation of screen-off of the mobile phone by a user in a video livestreaming scenario according to an embodiment of this application.

If no operation of tapping a cancel button 1011 by the user is detected within one minute, the mobile phone 01 enters a screen-off state as shown in FIG. 11D. If an operation of tapping a cancel button 1011 by the user is detected within one minute, the mobile phone 01 keeps in a screen-on state as shown in FIG. 11E.

It may be understood that in some implementations, when it is determined that the user has not used the mobile phone 01 for a long period of time, the method for reducing power consumption may alternatively be performed. In other words, the foregoing 402 may not be performed.

It may be understood that this application aims to reduce power consumption of the mobile phone 01 when it is determined that the user has not operated the mobile phone 01 for a long period of time, to prevent occurrences such as bulge or heat generation of the battery when the mobile phone 01 is placed in an unsafe place, and avoid situations endangering personal safety of the user. In addition, an operation on the mobile phone 01 by the user is discontinuous rather than constantly occurring. Therefore, in some implementations, even if it is determined that a usage state of the mobile phone 01 satisfies the foregoing first preset condition for a specific period of time and a current video playback state of the mobile phone 01 satisfies the second preset condition for a specific period of time, it is determined that the user is still using the mobile phone 01 provided that a second preset operation performed by the user on the mobile phone 01 is detected before the mobile phone 01 performs the method for reducing power consumption or the mobile phone 01 is already in a process of performing the method for reducing power consumption. In this case, the method for reducing the power consumption of the mobile phone 01 is not performed. The second preset operation includes but is not limited to the user adjusting volume by pressing a volume key on a side of the mobile phone 01, the user tapping, double tapping, triple tapping, touching and holding the screen, or the like.

For example, when it is determined that duration in which the mobile phone 01 is in the screen-on state exceeds 10 minutes, and no operation by the user is detected for more than 15 minutes from the time when it is determined that the mobile phone 01 is in the screen-on state, it is determined that the usage state of the mobile phone 01 satisfies the foregoing first preset condition. In addition, when it is determined that the mobile phone 01 satisfies the foregoing first preset condition, and when it is detected that a video playback scenario of the mobile phone 01 is a video loop playback scenario and that a quantity of loop playbacks of a current video exceeds 10, it is determined that a current video playback state of the mobile phone 01 satisfies the second preset condition, and then, it is detected that the user double taps the screen of the mobile phone 01. In this case, the mobile phone 01 does not perform the method for reducing power consumption, or if the mobile phone 01 is performing the method for reducing power consumption, the mobile phone 01 stops performing the method for reducing power consumption. In some implementations, if the second preset operation by the user satisfies a corresponding trigger condition, the mobile phone 01 performs a function corresponding to the trigger condition. For example, if the second preset operation performed by the user is adjusting volume of the mobile phone 01, the mobile phone 01 adjusts its own volume. This is not limited in this application.

A method for determining video playback scenarios of this application is described below with reference to the accompanying drawings. In general, a mobile phone 01 may obtain, by using a video decoder at an application framework layer of the mobile phone 01, information of a video currently played, to determine a video type of the current video, so as to determine a current video playback scenario of the mobile phone 01. Because this process includes interactions between software modules in the mobile phone 01, before describing the method for determining video playback scenarios of this application, a software structure framework of the mobile phone 01 in this application is described first.

Figure 12:
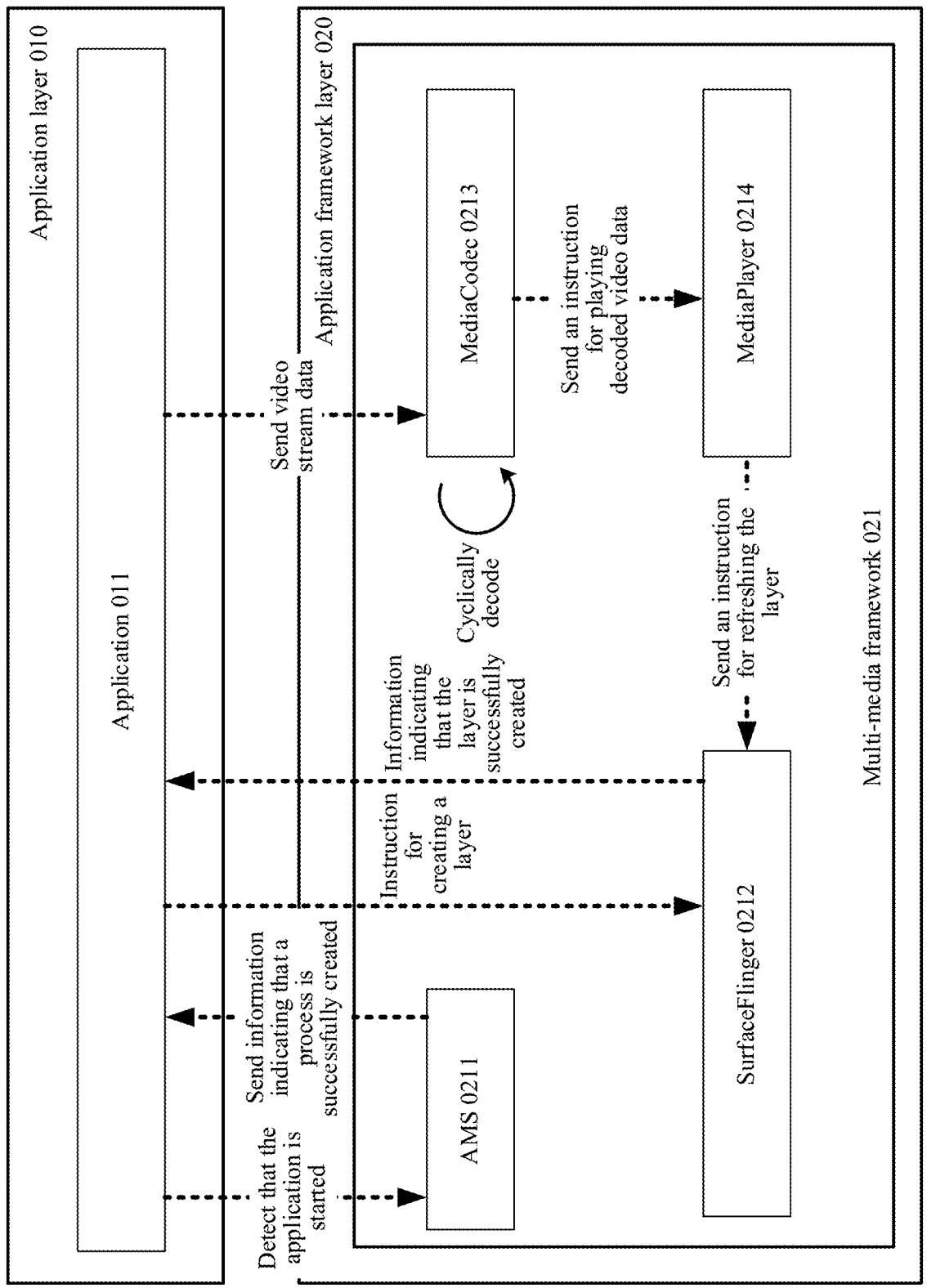
FIG. 12 shows a software layered structure of a mobile phone according to an embodiment of this application.

Specifically, FIG. 12 shows a diagram of a software layered architecture of the mobile phone 01. As shown in FIG. 12, the software structure of the terminal device 01 is separately divided into an application layer 010 and an application framework layer 020 from top to bottom by the layered architecture.

The application layer 010 may include a series of application packages. In some implementations of this application, the application layer 010 mainly includes an application 011, and the application 011 means various applications installed on a desktop of the mobile phone 01, for example, various types of video applications for playing videos. This is not limited in this application.

In some implementations, the application layer 010 may alternatively include a system program. The system program is a system program for managing the applications on the desktop of the mobile phone 01, and is a system that controls and coordinates the mobile phone 01 and an external device (for example, an input/output device) of the mobile phone 01 and supports application development and running on the mobile phone 01. In some implementations, the system program may be an operating system installed on the mobile phone 01, for example, an Android (android)® operating system or a Harmony® operating system. This is not limited in this application.

The application framework layer 020 of the mobile phone 01 provides an application programming interface (application programming interface, API) and a programming framework for the application at the application layer 010. The application framework layer 020 includes some predefined methods. The application framework layer 020 may include a multi-media framework layer 021. Further, the multi-media framework layer 021 includes a task Activity manager service (Activity Manager Service, AMS) 0211, a layer display control module (for example, Surface Flinger) 0212, a video decoder 0213, and a video player 0214.

In some implementations of this application, the AMS 0211 is configured to create a process corresponding to an application after detecting that the application is started. For example, after detecting that a video application is started, the AMS 0211 creates a progress corresponding to the video application. More specifically, the AMS 0211 creates a performing of video playback corresponding to the video application.

In some implementations of this application, the AMS 0211 establishes a video identifier for indicating whether the video belongs to a video livestreaming scenario or a video loop playback scenario while creating the video playback performing corresponding to the video application. The video identifier may be in a form of letters, numbers, or the like. This is not limited in this application.

In some implementations of this application, after completing the creation for the application process, the AMS 0211 sends information indicating that the process is successfully created to the application 011. For example, an example in which the application is a video application is used. After completing the creation of a process of the video application, the AMS 0211 sends information indicating that a video playback performing is successfully created to the video application. In some implementations, the information indicating that the performing is successfully created includes at least information that indicates a video type corresponding to the process and an application program to which the video belongs (for example, an identifier of the application).

In some implementations, the SurfaceFlinger 0212 is configured to create a layers, merge layers, and display a layers. In an implementation of this application, after the AMS 0211 completes the process creation, the application 011 sends an instruction for creating a layer to the SurfaceFlinger 0212. The SurfaceFlinger 0212 creates a layer corresponding to the application based on the instruction, to display a graphic interface corresponding to the application, for example, a video playback interface.

Figure 13A:
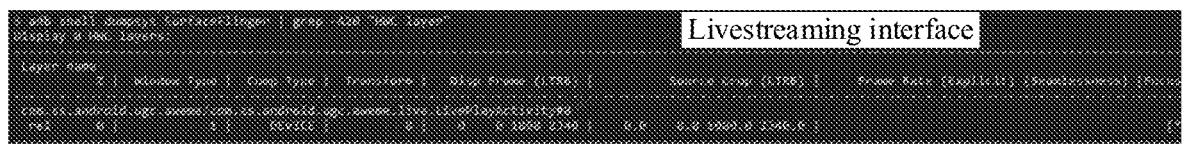
FIG. 13A is a schematic diagram of corresponding background data including an identifier of a layer (or an interface) corresponding to a live video according to an embodiment of this application.
Figure 13B:
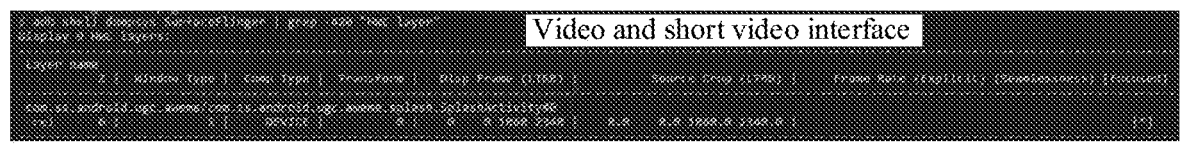
FIG. 13B is a schematic diagram of corresponding background data including an identifier of a layer (or an interface) corresponding to a non-live video according to an embodiment of this application.

In some implementations of this application, the foregoing instruction for creating a layer sent by the application 011 to the SurfaceFlinger 0212 at least instructs the SurfaceFlinger 0212 to create a layer with a corresponding video identifier. For example, as shown in FIG. 13A, for a live video, a name of a video livestreaming layer created by the SurfaceFlinger 0212, "com.ss.android.ugc.aweme/com.ss.android.ugc.aweme.live.LivePlayerActivity#0", includes a livestreaming keyword "live". For another example, as shown in FIG. 13B, for a non-live video, a name of a video livestreaming layer created by the SurfaceFlinger 0212, "com.ss.android.ugc.aweme/com.ss.android.ugc.aweme.splash.SplashActivity #0", includes a keyword "splash".

It may be understood that, in some implementations, with respect to identification of the video livestreaming scenario, whether a name of a layer corresponding to a current video includes a keyword (for example, "live") for identifying a live video may alternatively be detected by using an image recognition method (for example, an artificial intelligence recognition method). If it is determined that the name of the layer corresponding to the current video includes the keyword "live" for identifying the live video, it may be determined that the current video is a live video.

Similarly, after completing the layer creation, the SurfaceFlinger 0212 may alternatively send information indicating that the layer is successfully created to the application 011.

In some implementations of this application, the video application may alternatively send video stream data corresponding to a to-be-played video to the video decoder (MediaCodec) 0213. The MediaCodec 0213 decodes the video for the video stream data, and sends the decoded video stream data to the video player (MediaPlayer) 0214. In addition, the MediaPlayer 0214 sends to the SurfaceFlinger 0212 an instruction for refreshing a layer corresponding to the video application, to play the video.

More specifically, after receiving a video sent by the video application, the MediaCodec 0213 generates an identifier (ID) of a MediaCodec object for the video, and invokes a start( ) method of the MediaCodec to decode the video.

In addition, in some implementations, for the video loop playback scenario, because playback of a new video is not included, the MediaCodec 0213 invokes, during each playback in the video loop playback scenario, a flush( ) method to refresh a corresponding video playback interface.

In some other implementations, for the automatic video playback scenario, because playback of new videos is included, it may be understood that the MediaCodec 0213 generates a corresponding MediaCodec ID for each new video received, and invokes the start( ) of the MediaCodec to decode the video. After the video playback ends, an end( ) method of the MediaCodec is invoked to end the decoding and the playback of the current video.

It should be noted that, for the video livestreaming scenario, the MediaCodec 0213 may alternatively generate a MediaCodec ID for the video livestreaming scenario, and invokes the start( ) of the MediaCodec to decode a video. After video playback ends, an end( ) method of the MediaCodec is invoked to end the decoding and the playback of the current video.

However, in this application, the video livestreaming scenario is a video livestreaming scenario that does not support loop playback and automatic playback, and a video livestreaming scenario that supports the loop playback and the automatic playback should be a video loop playback scenario or an automatic live stream playback in this application. Details are not described below again.

It may be understood that the schematic diagram of the layered architecture of the foregoing software structure of the foregoing mobile phone 01 is merely an example. In another implementation, the layered architecture of the software structure may of the foregoing mobile phone 01 alternatively include more or fewer layers, or a layered structure formed in another manner. For example, in some implementations, the mobile phone 01 may alternatively include a kernel layer, a physical layer (physic, PHY), and the like. It should be understood that this is not limited in this application.

Figure 14A:
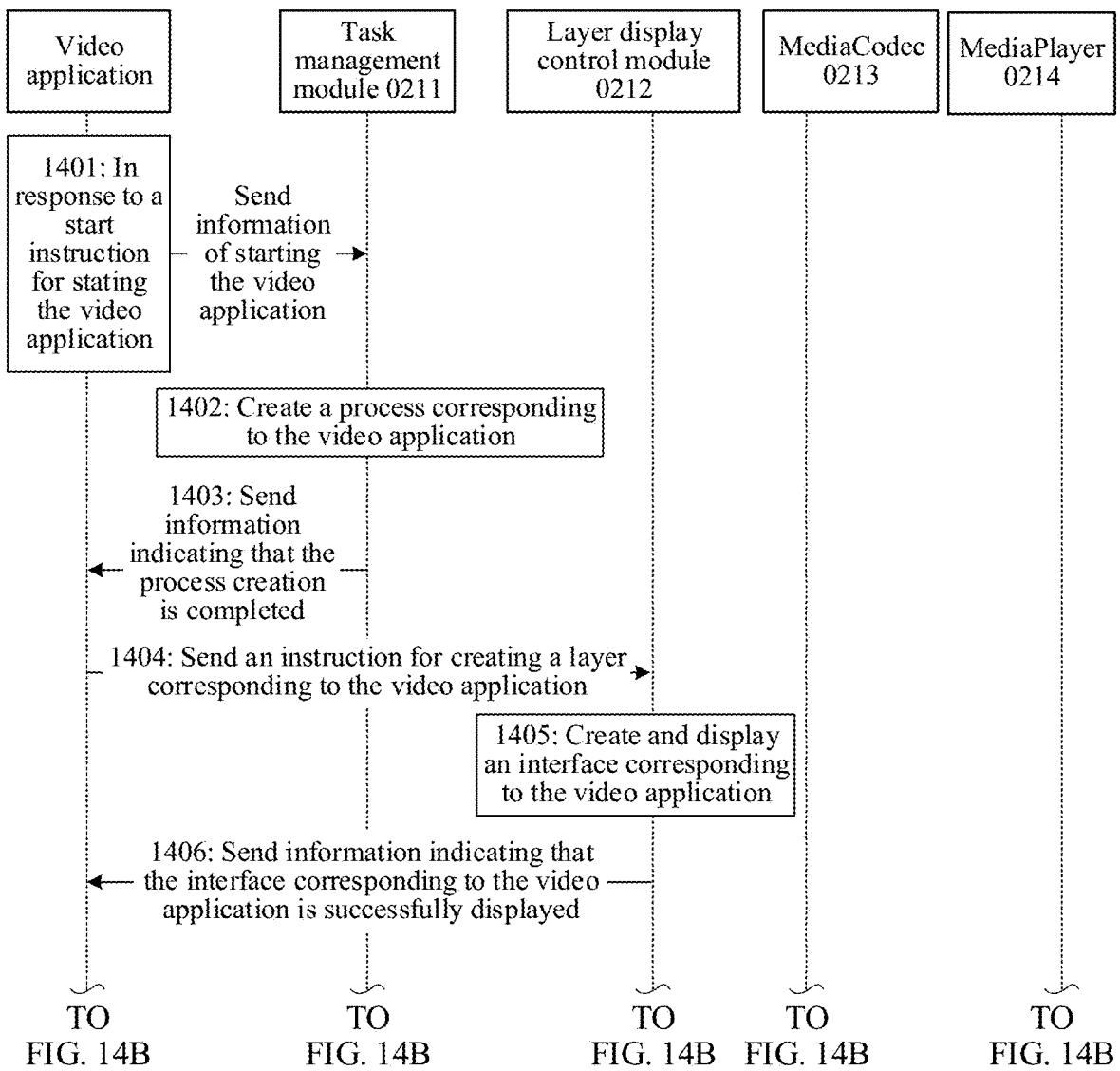
FIG. 14A and FIG. 14B are a schematic flowchart of interactions between software modules of the mobile phone in FIG. 12 of this application according to an embodiment of this application.
Figure 14B:
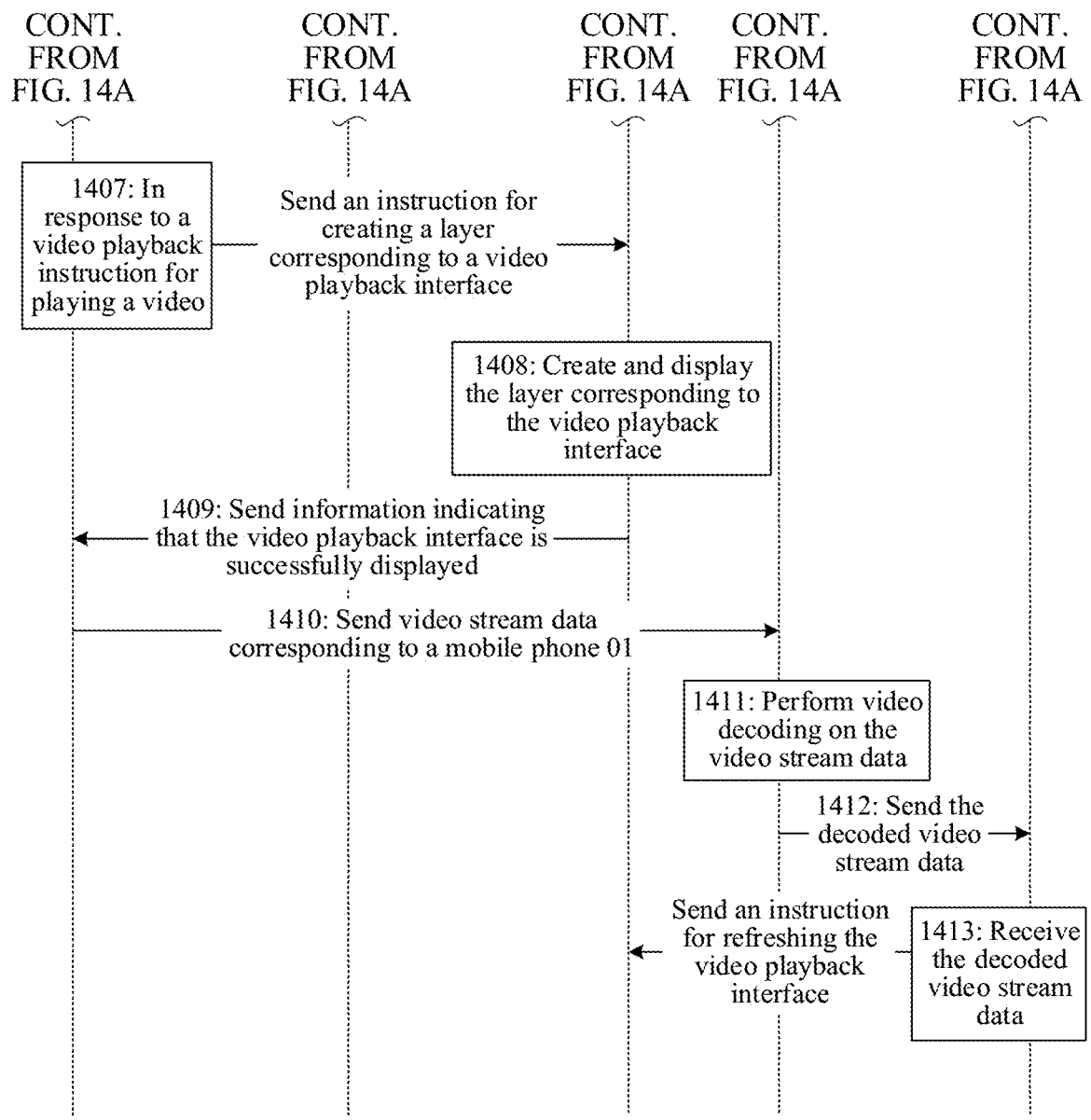

An interaction process between the software modules of the mobile phone 01 is described below with reference to FIG. 14A and FIG. 14B. For contents the same as those in FIG. 12, refer to the foregoing related descriptions. Details are not described below again. As shown in FIG. 14A and FIG. 14B, the process includes the following steps.

1401: In response to a start instruction for stating a video application, the video application sends information of starting the video application to the task management module 0211. In some implementations, the start instruction of the video application may be generated when a preset start operation for the video application performed by a user is detected by the mobile phone 01. The preset start operation includes but is not limited to a preset gesture such as tapping or touching and holding performed by the user, or the user opens the video application in a voice instruction manner.

1402: The task management module 0211 creates a process corresponding to the video application. It may be understood that, as described above, for each application that is started, the task management module 0211 establishes a corresponding process.

1403: The task management module 0211 sends information indicating that the process creation is completed to the video application.

1404: The video application sends to the layer display control module 0212 an instruction for creating a layer corresponding to the video application.

1405: The layer display control module 0212 creates and displays an interface corresponding to the video application.

1406: The layer display control module 0212 sends information indicating that the interface corresponding to the video application is successfully displayed to the video application.

It may be understood that, for a video application, in general, after the video application is started, a video is not directly played, but it is required to determine, based on further instructions of a user, whether to play a video or to implement another function (for example, member charging) other than playing a video. Therefore, the foregoing 1401 to 1406 are provided for establishing a corresponding interface after the video application is started, to provide preparations for subsequent video playbacks. An interaction process between the software modules of the mobile phone 01 in a video playback process is described below. For contents the same as those in the foregoing 1401 to 1406, refer to the foregoing related descriptions. Details are not described herein again.

1407: In response to a video playback instruction for playing a video, the video application sends to the layer display control module 0212 an instruction for creating a layer corresponding to a video playback interface.

In some implementations, the video playback instruction may be generated when a preset playback operation for a video performed by the user is detected by the mobile phone 01. The preset playback operation includes but is not limited to a preset gesture such as tapping or touching and holding performed by the user, or the user controls the video playback in a voice instruction manner. This is not limited in this application.

In some implementations, the sending an instruction for creating a layer corresponding to a video playback interface to the layer display control module 0212 includes at least information indicating a video type, so that when creating the layer corresponding to the video playback interface for the video, the layer display control module 0212 can create an identifier corresponding to the video type for the layer.

1408: The layer display control module 0212 creates and displays the layer corresponding to the video playback interface.

In some implementations, the layer display control module 0212 creates a corresponding layer for the video based on the foregoing layer creation instruction, and simultaneously adds an identifier corresponding to the video type for the layer. In some implementations, the identifier corresponding to the video type may be a letter, a number, or the like that indicates the video type. This is not limited in this application.

1409: The layer display control module 0212 sends information indicating that the video playback interface is successfully displayed to the video application.

1410: The video application sends video stream data corresponding to a current video to the MediaCodec 0213.

It may be understood that to reduce data traffic resources occupied by the video stream data in network transmission, the video stream data in the network transmission is generally compressed video stream data after being encoded and compressed, and therefore, when the mobile phone 01 plays the video, decoding and decompression are also required to be performed on the compressed video stream data. In an implementation of this application, the mobile phone 01 decodes compressed video stream data corresponding to the current video by using the MediaCodec 0212. Decoding video stream data is a technical means commonly known to a person skilled in the art. This is not limited in this application.

1411: The MediaCodec 0213 decodes the video stream data.

As described above, in some implementations, after receiving the video stream data corresponding to the current video, the MediaCodec 0213 establishes a MediaCodec ID for the current video and invokes a start( ) method to decode the video.

1412: The MediaCodec 0213 sends the decoded video stream data to the MediaPlayer 0214.

1413: The MediaPlayer 0214 receives the decoded video stream data and sends to the layer display control module 0212 an instruction for refreshing the video playback interface.

It may be understood that in the video playback process, the decoding of the video is continuously performed. Therefore, the MediaPlayer 0214 needs to send the decoded video data to the layer display control module 0212 in real time for display, to update the foregoing layer corresponding to the video playback interface and implement the playback of the video.

The foregoing 1407 to 1413 is the interaction process between the software modules of the mobile phone 01 in the video playback process. It may be understood that, as described above, when the MediaCodec 0213 invokes a stop( ) method to end the decoding for the current video stream data, it indicates that the playback of the current video ends. In addition, for a video loop playback scenario, the MediaCodec 0213 may invoke a flush( ) method to reuse a first decoding result, and redecoding does not need to be performed in loop playback, and then the decoded video data is sent to the MediaPlayer 0214. The MediaPlayer 0214 sends the received decoded video stream data to the layer display control module 0212, and the display control module 0212 refreshes the video playback interface based on the received decoded video stream data.

The foregoing method for determining a quantity of loop playbacks and time in a video loop playback scenario is described below with reference to the accompanying drawings.

It may be understood that, for the video loop playback scenario, because a video played each time is the same video, whether a current video playback scenario is the video loop playback scenario may be determined by determining whether video content is the same in a specific period of time.

Specifically, in some implementations, when the mobile phone 01 starts playing a video (that is, the MediaCodec 0213 invokes a start( ) method to start decoding), a screen capturing operation is performed on the mobile phone 01, to obtain a first image including content in a video currently played. Then, the mobile phone 01 determines first duration of the video currently played, and a screen capturing operation is performed on the mobile phone 01 again after an interval of the first duration, to obtain a second image including the content in the video currently played. Then, similarity between the first image and the second image is compared, and if the similarity between the first image and the second image is greater than a first similarity threshold, it indicates that the first image is identical to the second image, in other words, the mobile phone 01 is in the video loop playback scenario. The similarity between the images may be a vector Euclidean distance, a Hamming distance, or the like that is between image vectors and that indicates an image feature. In addition, a method for comparing similarity between images is a means commonly known to a person skilled in the art. This is not limited in this application. The first similarity threshold is an empirical value or an experimental value, for example, may be 95%. This is not limited in this application.

A manner for determining the first duration of the currently played video by the mobile phone 01 may be that the mobile phone 01 performs a screen capturing operation on the currently played video at an interval of second duration, and then determines duration of the currently played video based on lengths of video playback progress bar in the images obtained by the two screen capturing operations. The second duration is an empirical value or an experimental value, for example, may be five seconds. This is not limited in this application.

Figure 15A:
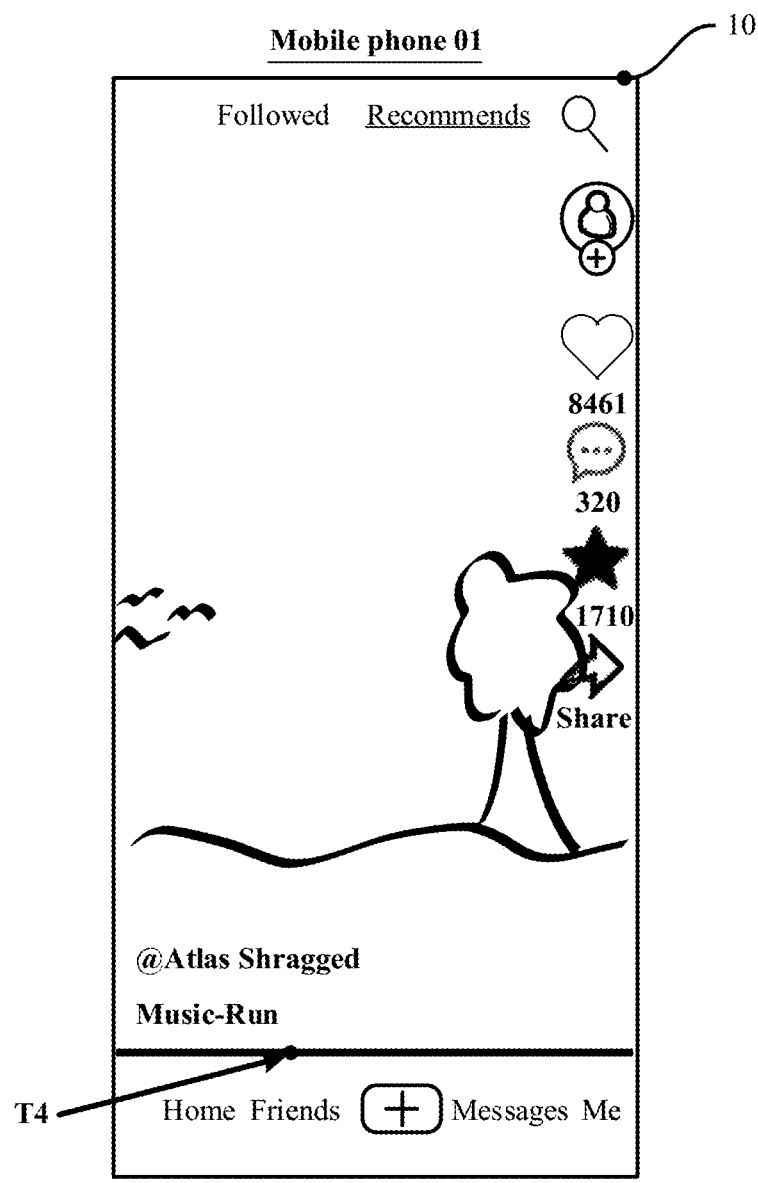
FIG. 15A is a schematic diagram of an interface of a mobile phone during playback of a video (in which a video playback progress bar is at T4) according to an embodiment of this application.
Figure 15B:
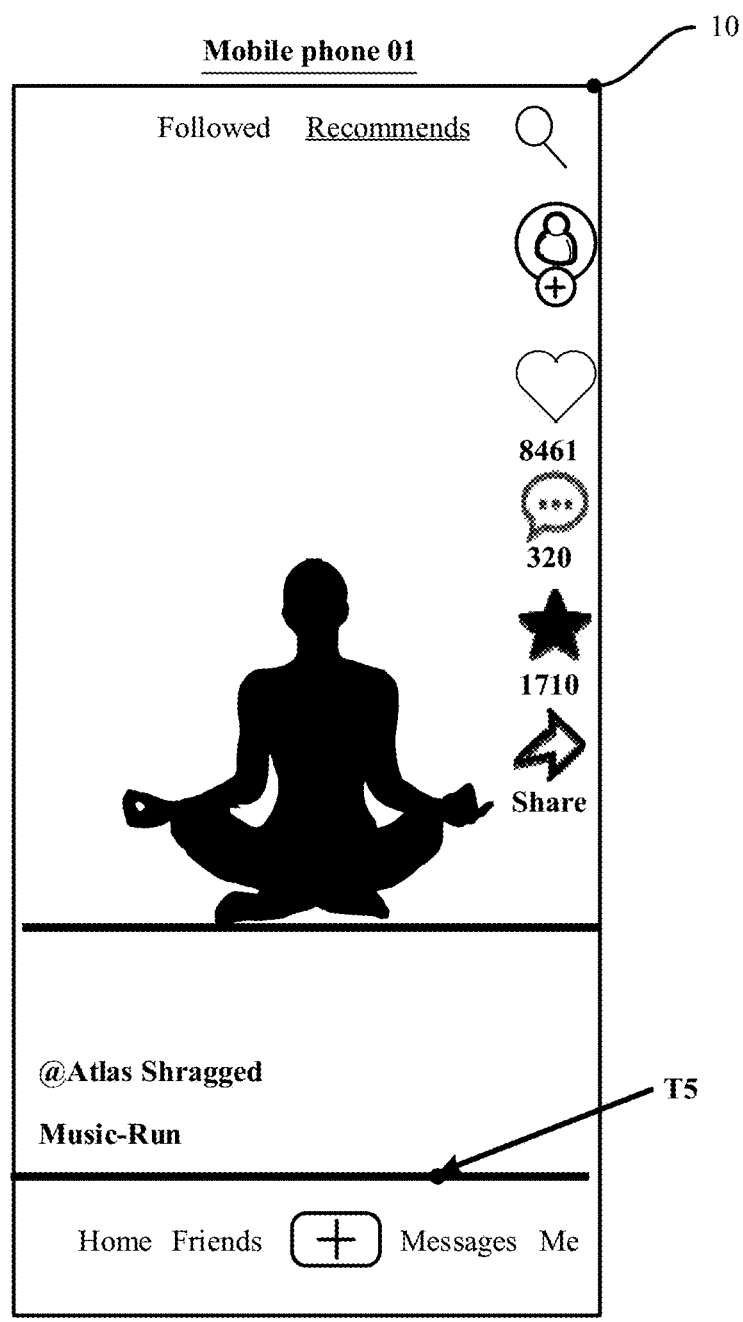
FIG. 15B is a schematic diagram of an interface of a mobile phone during playback of a video (in which a video playback progress bar is at T5) according to an embodiment of this application.
Figure 15C:
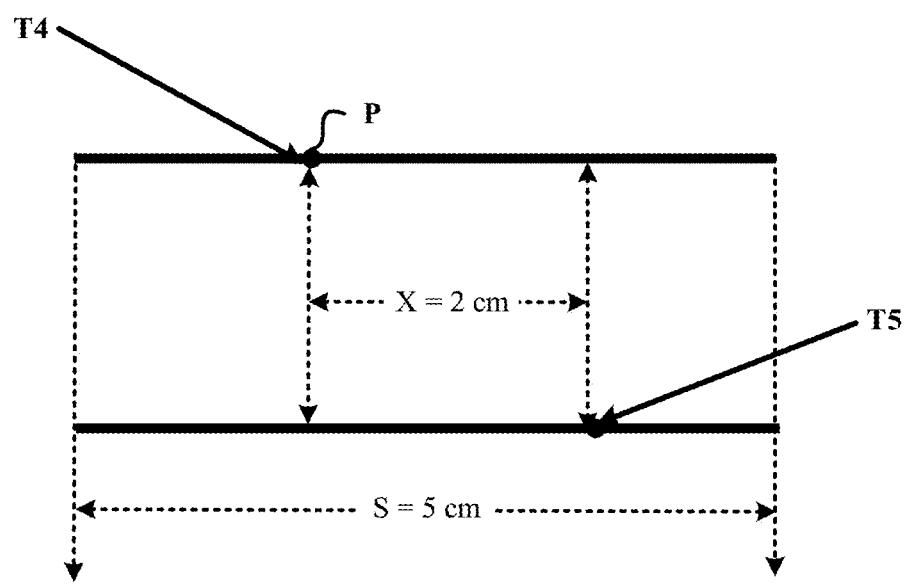
FIG. 15C is a schematic diagram of comparison between the video playback progress bars in FIG. 15A and FIG. 15B.

For example, assuming that the image obtained by capturing the currently played video by the mobile phone 01 for the first time is shown in FIG. 15A, and after an interval of five seconds, an image obtained by capturing the currently played video is FIG. 15B. In this case, comparison between the video playback progress bars in the two images may be as shown in FIG. 15C, that is, the video playback progress bar moves from T4 to T5 (a movement distance is X=2 cm) after five seconds. As can be learned from FIG. 15C, a total length of the current video playback progress bar is S=5 cm. Therefore, it can be learned that total duration of the current video T=(S/X)×5=(5/2)×5=12.5 s. In some implementations, the moving distance of the video playback progress bar may be determined by the mobile phone 01 based on a moving distance of a small dot P (for example, as shown in FIG. 15C) on the video playback progress bar. This is not limited in this application.

In some other implementations, a currently played video may have no video playback progress bar or the video playback progress bar is blocked, and in this case, playback duration of the current video may be third duration by default. Then, two screen capturing operations are performed on the current video based on the third duration, to obtain images representing content in the current video, and similarity of the images is compared by using the foregoing method, to determine whether the mobile phone 01 is in a video loop playback state. The third duration is an empirical value or an experimental value. For example, the first preset duration may be 30 seconds or 10 minutes. This is not limited in this application. In some implementations, the content in the current video includes at least subtitles, portraits, or the like of the current video. This is not limited in this application.

Figure 16:
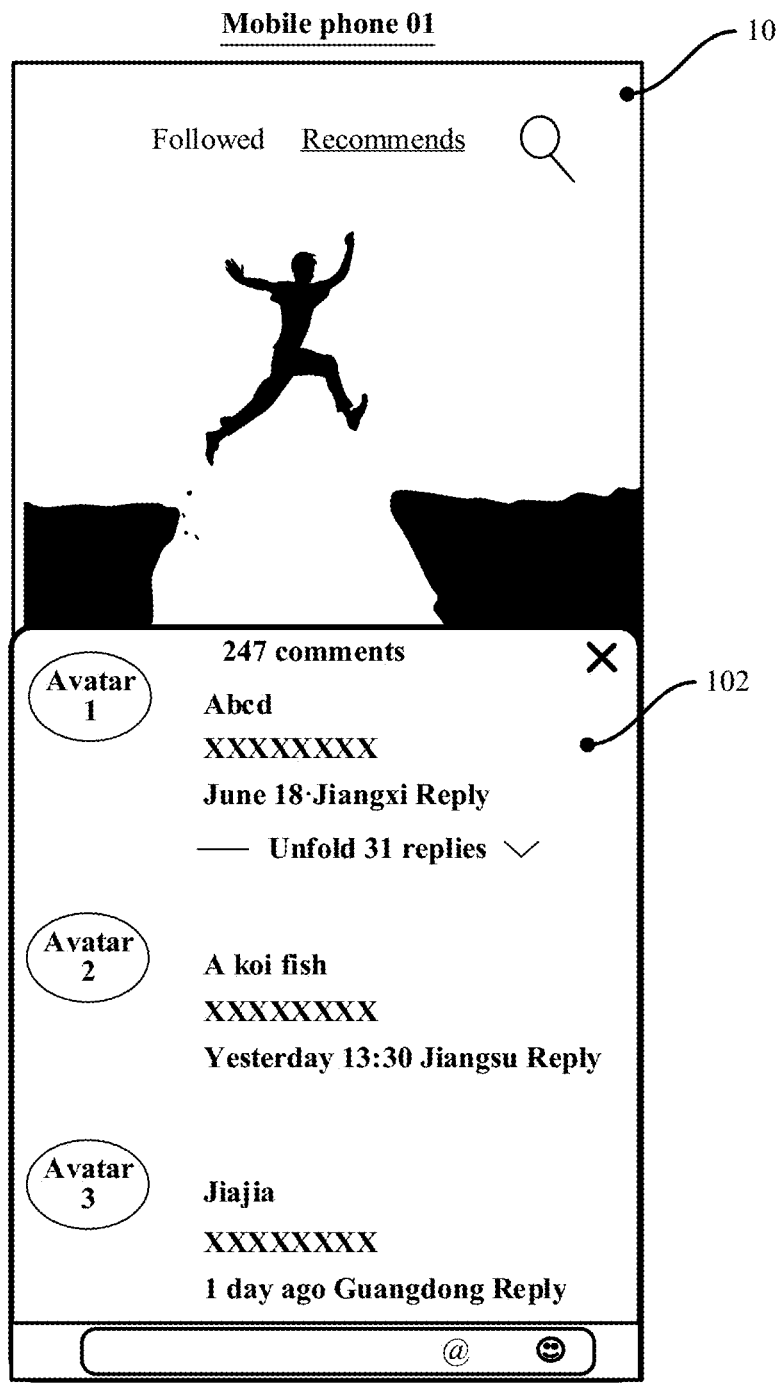
FIG. 16 is a schematic diagram of an interface of a mobile phone when a video playback progress bar is blocked during playback of a video according to an embodiment of this application.

Alternatively, for a case in which the video playback progress bar is blocked, for example, as shown in FIG. 16, the video playback progress bar is blocked by a comment region interface 102 opened by the user. In this case, the mobile phone 01 may perform a screen capturing operation on a current interface 10 to obtain a third image, and then, a screen capturing operation is performed on the current interface 10 at an interval of fourth duration. In addition, similarity between each image obtained after each screen capturing and the third image is compared. If the similarity between the image and the third image is greater than a second similarity threshold, it indicates that the mobile phone 01 is in the video loop playback scenario.

It may be understood that in the foregoing image recognition method, an intelligent recognition function integrated on the mobile phone 01 may be used or an intelligent recognition service (for example, Accessibility Service) provided by a third-party platform may be invoked to determine whether the images are similar. Specifically, the mobile phone 01 may utilize intelligent recognition in the intelligent recognition function to extract text content in the obtained images, and then determine whether the two images are similar by comparing similarity of the text content in the two images, to determine whether the current video is a video played in loop, that is, whether the mobile phone 01 is in the video loop playback scenario. This is not limited in this application.

In addition, in some other implementations, as described above, for the video loop playback scenario, because no new video is included, the MediaCodec 0213 only invokes a flush( ) method to refresh a video playback interface and play the video repeatedly.

Figure 17:
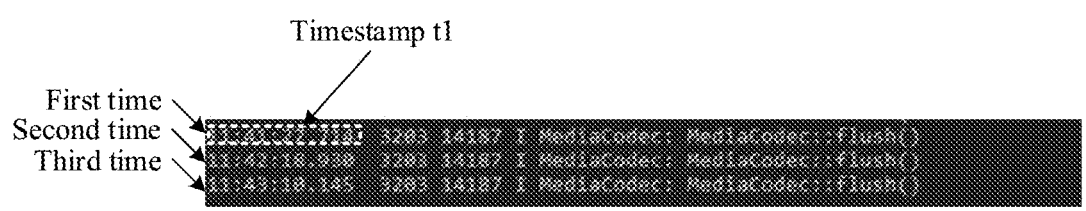
FIG. 17 is a schematic diagram of background data in a video loop playback scenario according to an embodiment of this application.

In this case, the mobile phone 01 may determine the quantity of playbacks and the time in the video loop playback scenario through a quantity of times and time intervals of the flush( ) method invoked by the MediaCodec 0213. Specifically, as shown in FIG. 17, the mobile phone 01 may obtain information of the flush( ) invoked by the MediaCodec 0213. The information includes time information (for example, a timestamp t1 in FIG. 15) and the quantity of times of invoking the flush( ). It may be understood that the quantity of playbacks in the video loop playback scenario is the quantity of times of invoking the flush( ), and the playback duration in the video loop playback scenario is a difference between time when the flush( ) is invoked the first time and time when the flush( ) method is currently invoked. For example, as shown in FIG. 17, the time when the flush( ) method is invoked the first time is: 11:41:27:714, and time when the flush( ) method is invoked the third time is: 11:43:10:145. In this case, time taken for a video to be played three times in loop should be (11:43:10:145-11:41:27:714).

The foregoing method for determining a quantity of playbacks and time in an automatic video playback scenario is described below with reference to the accompanying drawings.

Similar to the foregoing determining the quantity of playbacks in the video loop playback scenario, when the mobile phone 01 plays a current video, the MediaCodec 0213 may invoke a start( ) method to decode current video stream data and play the current video. However, different from the video loop playback scenario, because playback of new videos is included in the automatic video playback scenario, the MediaCodec 0213 may invoke a stop( ) method to stop decoding the current video when the playback of the current video is finished. Then, when a next video (a new video) sent by a video application is received, the start( ) method is invoked again to decode current video stream data and play the current video, and when the video playback is finished, the stop( ) method is invoked to stop decoding the current video.

Figure 18:
FIG. 18 is a schematic diagram of background data in an automatic video playback scenario according to an embodiment of this application.

In this case, the mobile phone 01 may determine a quantity of automatic playback and time in the automatic video playback scenario through a quantity of times and time intervals between groups of invoking a group of start( ) and stop( ) methods by the MediaCodec 0213. Specifically, as shown in FIG. 18, the mobile phone 01 may obtain information of the start( ) method invoked by the MediaCodec 0213 when playing the current video, and information of the stop( ) method corresponding to the start( ) method. The information includes time information (for example, a timestamp t2 in FIG. 18) of invoking the start( ) and time information (for example, a timestamp t3 in FIG. 18) of invoking the stop( ) method. It may be understood that the quantity of playbacks in the video loop playback scenario is the quantity of times of invoking the start( ) method (or the stop( )), and video playback duration is a difference between time when the start( ) is invoked the first time and time when the start( ) method is currently invoked. For example, as shown in FIG. 18, the time when the start( ) method is invoked the first time is: 15:03:09:768, and time when the start( ) method is invoked the second time is: 15:03:24:206. In this case, the video playback duration should be (15:03:24:206-15:03:09:768).

The method for determining that livestreaming ends in a video livestreaming scenario is described below with reference to the accompanying drawings.

It may be understood that for any video, the MediaCodec 0213 of the mobile phone 01 may invoke a start( ) method to decode video stream data and play the video. In addition, when video playback is finished, a stop( ) method is invoked to stop decoding the current video. Different from the video loop playback scenario and the automatic video playback scenario, a video is not played in loop or videos are not automatically played when the video livestreaming scenario ends. Therefore, in some implementations, if it is determined that a current video is in a video livestreaming scenario, it may be determined that livestreaming ends in the current video livestreaming scenario when the MediaCodec 0213 invokes the stop( ) method.

It may be understood that in some cases, after video livestreaming end, the mobile phone 01 may automatically play an advertisement video in loop or automatically and continuously play different advertisement videos. In this case, because principles of video playback are similar, the mobile phone 01 may still determine, by using the foregoing method for determining a video loop playback scenario and an automatic video playback scenario, whether the mobile phone 01 is playing an advertisement video in loop or continuously playing different advertisement videos. This is not limited in this application.

It may be understood that, in the video livestreaming scenario, after livestreaming ends, information prompting the end of the livestreaming is generally displayed. For example, as shown in FIG. 3B, after a video livestreaming scenario 11 ends, the interface 10 of the mobile phone 01 displays information prompting a user that "current livestreaming ends, and accumulated quantity of watching times is 60,000+". Therefore, in some implementations, the mobile phone 01 may alternatively perform screen capturing at intervals of a preset time period to obtain an image of a current interface of the mobile phone 01, then identify texts in the image of the current interface of the mobile phone 01 to determine whether the texts in the image of the current interface include a preset keyword, and when it is determined that the texts in the image of the interface include the preset keyword, determine that livestreaming ends in the video livestreaming scenario. The preset keyword includes but is not limited to a keyword indicating the end of the livestreaming (for example, "current livestreaming ends"). This is not limited in this application.

It may be understood that, for the video livestreaming scenario, amounts of downlink data traffic of the mobile phone 01 before and after livestreaming ends in the video livestreaming scenario are different. In general, the downlink data traffic of the mobile phone 01 during the livestreaming may be greater than the downlink data traffic of the mobile phone 01 after the livestreaming ends. For example, during livestreaming, downlink data traffic of the mobile phone 01 is generally 300 kb/s, and after the livestreaming ends, the downlink data traffic of the mobile phone 01 reduces to 100 kb/s. Therefore, in some implementations, whether livestreaming ends in the video livestreaming scenario scene may be determined based on the amount of the downlink data traffic of the mobile phone 01. Specifically, the mobile phone 01 may obtain the downlink data traffic of the mobile phone 01 in real time or at intervals of a preset time period, and when the data traffic is smaller than a data traffic threshold, determine that the livestreaming ends in the video livestreaming scenario. The data flow threshold may be an empirical value or an experimental value. For example, the data flow threshold may be 100 kb/s. This is not limited in this application. In some implementations, the mobile phone 01 may obtain the downlink data traffic of the mobile phone 01 through a service such as TrafficsStats, NetWorkStatsMananger, and laware. It should be understood that a manner for obtaining the downlink data traffic of the mobile phone 01 is a technical means commonly known to a person skilled in the art. This is not limited in this application.

It may be understood that in some cases, a user has watched videos for a long period of time or a specific video has played in loop for a long period of time. If the method for reducing device power consumption in this application is continuously used to reduce power consumption of the mobile phone 01 and even enable the mobile phone 01 to enter a screen-off state, and consequently, user experience is definitely affected. Therefore, in some implementations, when the mobile phone 01 detects that the user disables a function of the mobile phone 01 for reducing power consumption of a device, even if it is detected that a usage state and a video playback state of the mobile phone 01 satisfy the foregoing conditions, the power consumption of the mobile phone 01 may not be reduced.

Figure 19A:
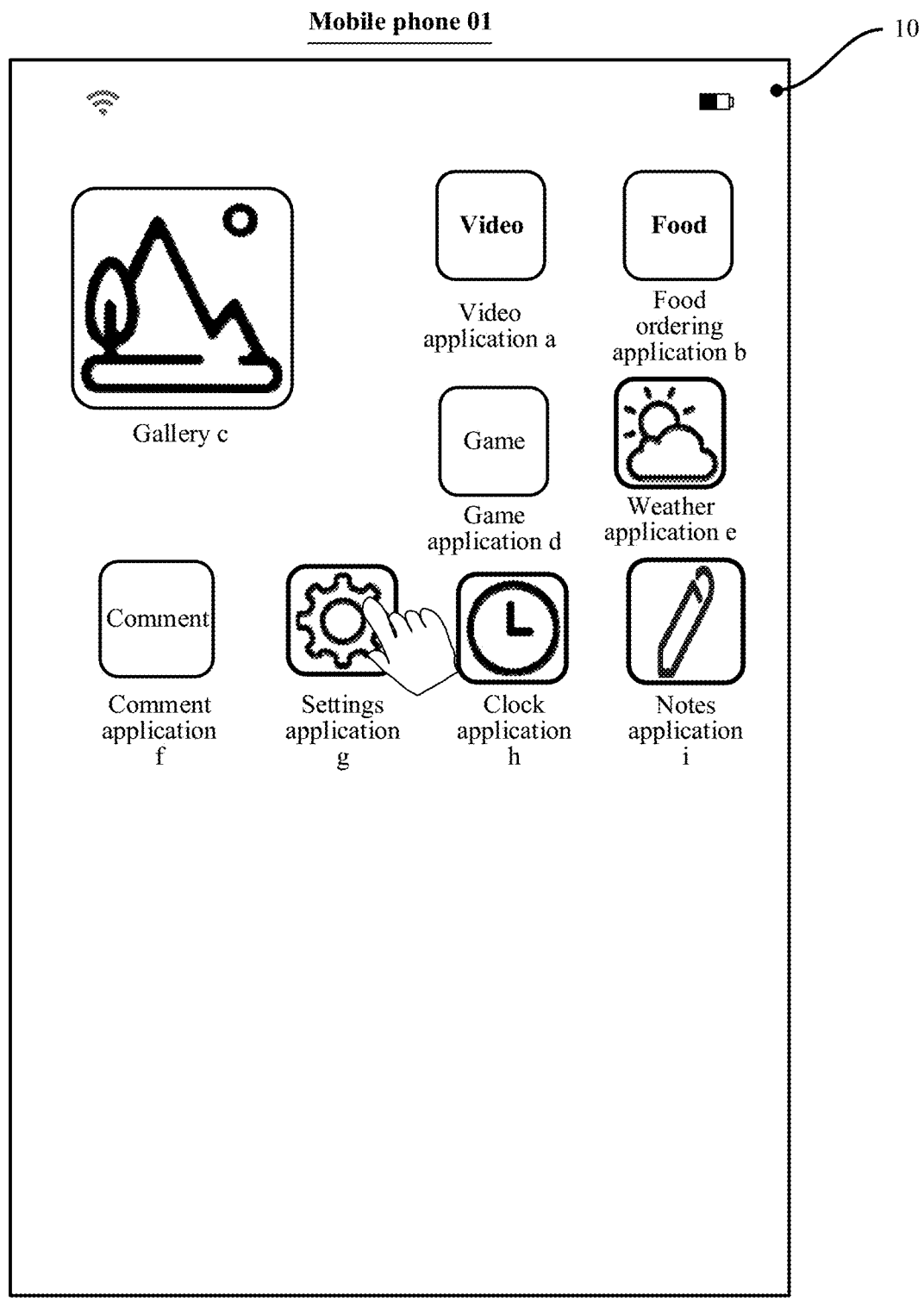
FIG. 19A is a schematic diagram of an interface of a mobile phone according to an embodiment of this application.
Figure 19B:
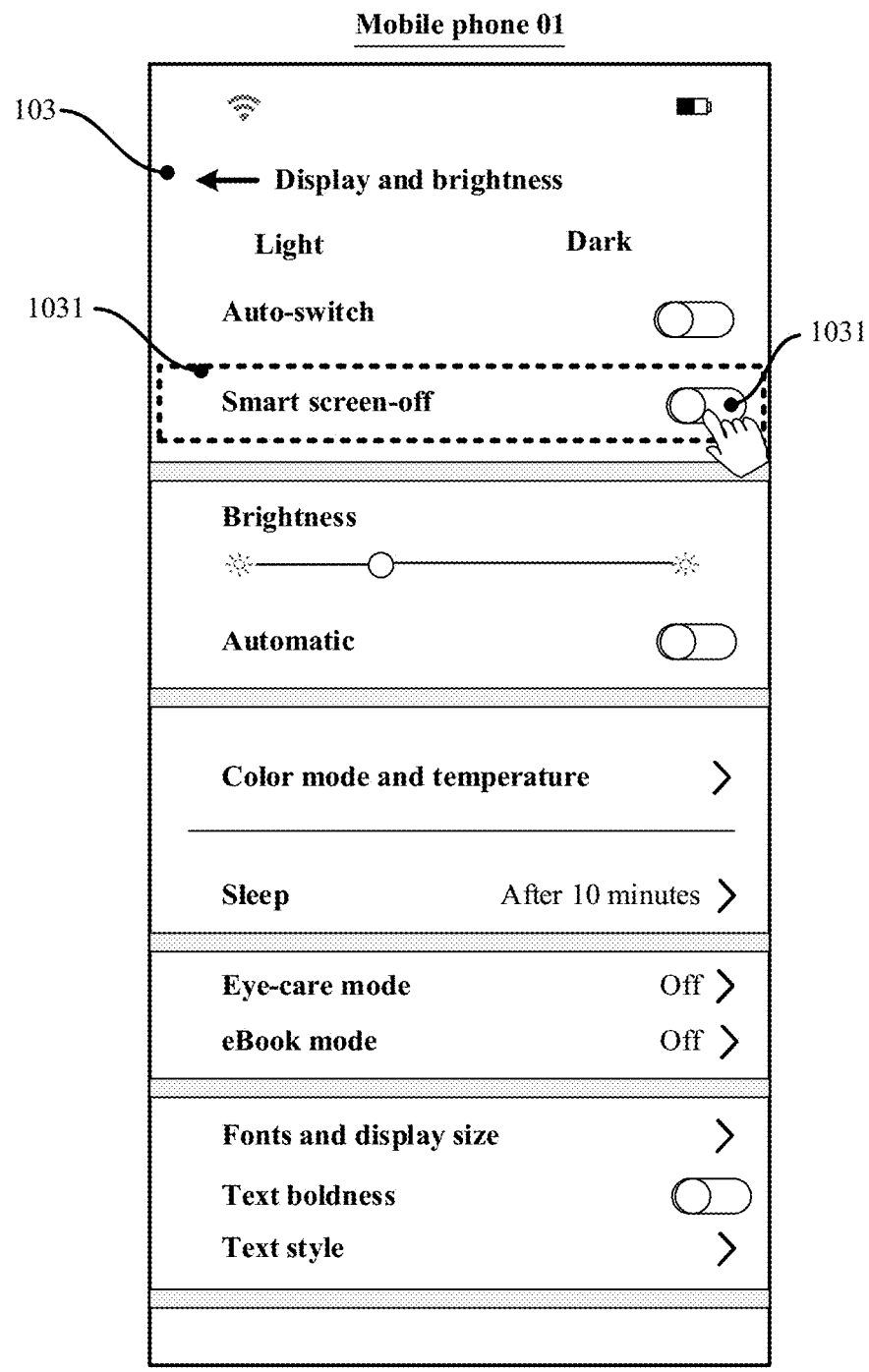
FIG. 19B is a schematic diagram of an interface of a settings application of a mobile phone according to an embodiment of this application.

Specifically, for example, as shown in FIG. 19A, the user may enter a display and brightness setting interface 103 shown in FIG. 19B by tapping a settings application g displayed on a desktop of the mobile phone 01, and then disable a smart screen-off function (that is, a function of automatically reducing power consumption of a device in this application) through a control 1031.

In this way, more selections are provided for a user, so that the mobile phone 01 can determine, based on requirements of the user, whether to reduce the power consumption, and user experience can be improved.

Figure 20:
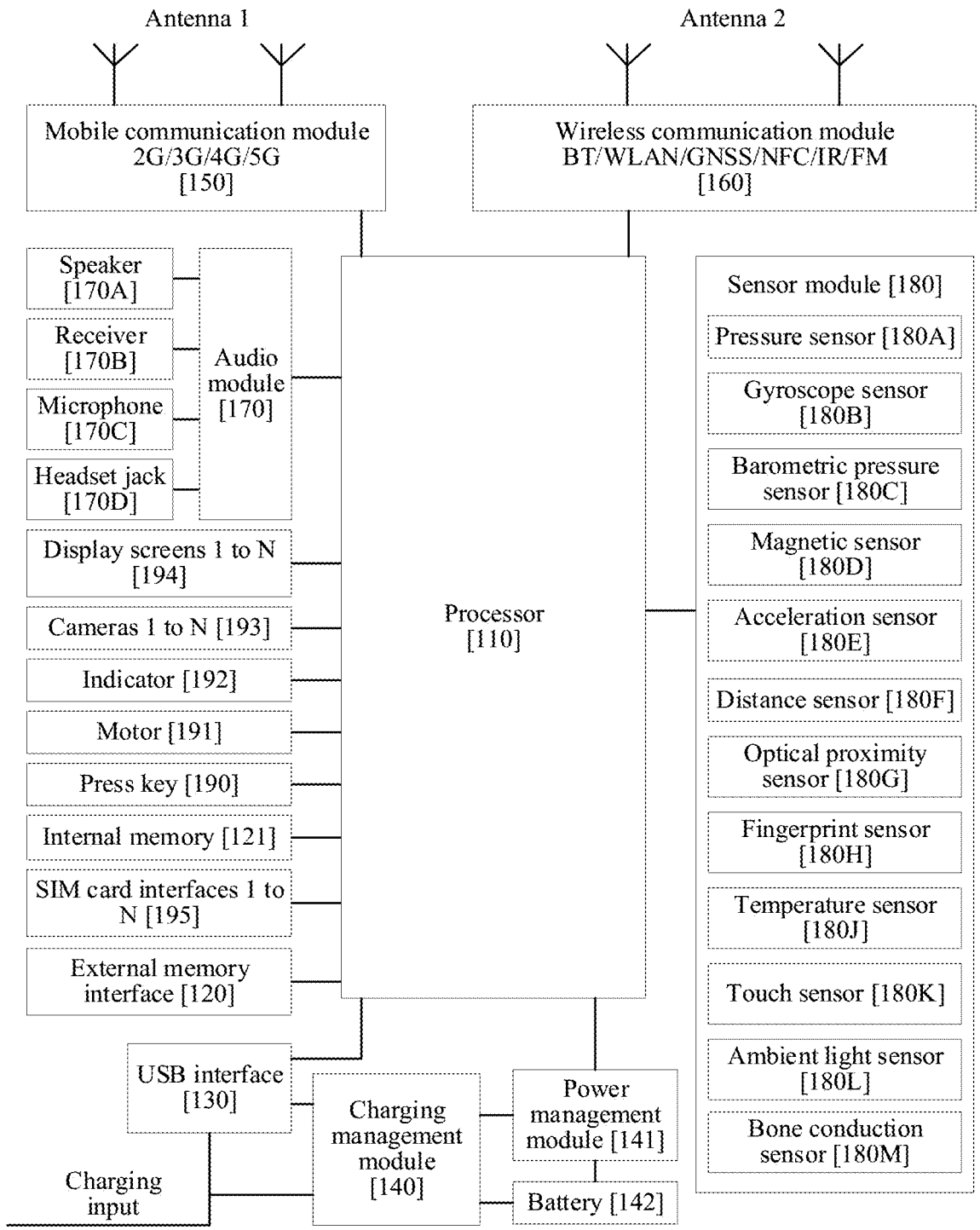
FIG. 20 is a schematic diagram of a hardware structure of an electronic device according to an embodiment of this application.

For example, FIG. 20 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a press key 190, a motor 191, an indicator 192, cameras 193, display screens 194, subscriber identification module (subscriber identification module, SIM) card interfaces 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate devices, or may be integrated into one or more processors. The controller may be a nerve center and a command center of the electronic device 100. The controller may generate an operation control signal based on instruction operation code and a timing signal, to complete control of instruction fetching and instruction execution.

A memory configured to store instructions and data may be further disposed in the processor 110. In some embodiments, the memory in processor 110 is a cache memory. The memory may store instructions or data recently used or cyclically used by the processor 110. If the processor 110 needs to use the instructions or the data again, the processor 110 may directly invoke the instructions or the data from the memory. This avoids repeated accessing and reduces a wait time for the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that a schematic interface connection relationship between the modules in embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The power management module 141 is configured to be connected to the battery 142, the charging management module 140, and the processor 110. In some implementations of this application, a mobile phone 01 may obtain information of power and temperature of a battery of the mobile phone 01 by using the battery management module 141. In some other implementations of this application, during performing the method for reducing device power consumption, the mobile phone 01 may control a maximum current for charging the battery of the mobile phone 01 by using the charging management module 140. This is not limited in this application.

A wireless communication function of the electronic device 100 may be implemented by using the antenna 1, the antenna 2, the mobile communication module 150, the wireless communication module 160, the modem processor, the baseband processor, and the like. The mobile communication module 150 may provide a solution applied to the electronic device 100 for wireless communication including 2G/3G/4G/5G and the like. The wireless communication module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. In some implementations, the mobile phone 01 may implement a communication connection with the foregoing smart wearable device by using the wireless communication module 160.

The electronic device 100 implements a display function by using the GPU, the display screen 194, the application processor, and the like. The GPU is a microprocessor for image processing and is connected to the display screen 194 and the application processor. The GPU is configured to perform mathematical and geometric calculations for graphics rendering. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display, LCD) panel, an organic light-emitting diode (organic light-emitting diode, OLED) panel, an active-matrix organic light emitting diode panel or an active-matrix organic light emitting diode (active-matrix organic light emitting diode, AMOLED) panel, a flexible light-emitting diode (flex light-emitting diode, FLED) panel, a MiniLed panel, a MicroLed panel, a Micro-OLED panel, a quantum dot light emitting diode (quantum dot light emitting diodes, QLED) panel, or the like. In some embodiments, the electronic device 100 may include 1 or N display screens 194. N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is opened, and light is transmitted to a photosensitive element of the camera through a lens. An optical signal is converted into an electrical signal. The photosensitive element of the camera transfers the electrical signal to the ISP for processing, so that the ISP converts the electrical signal into an image visible to naked eyes. The ISP may alternatively perform algorithm optimization on noise, brightness, and a skin tone of the image. The ISP may alternatively optimize parameters such as exposure and color temperature of a photographed scene. In some embodiments, the ISP may be disposed in the camera 193.

The camera 193 is configured to capture a still image or video. An optical image is generated for an object by using the lens and is projected onto the photosensitive element. The photosensitive element in some embodiments, the electronic device 100 may include 1 or N cameras 193, where N is a positive integer greater than 1.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, and text understanding.

The external memory interface 120 may be configured to be connected to an external storage card such as a micro SD card, to expand a storage capability of the electronic device 100. The external storage card communicates with the processor 110 through the external memory interface 120, to implement a data storage function, for example, to store files such as music and a video in the external storage card.

The internal memory 121 may be configured to store computer-executable program code. The executable program code includes instructions. The processor 110 runs the instructions stored in the internal memory 121, to perform various functional applications and data processing of the electronic device 100. The internal memory 121 may include a program storage area and a data storage area. The program storage area may store an operating system, an application required by at least one function (such as a sound playback function and an image display function), and the like. The data storage region may store data (such as audio data and a phone book) and the like created when the electronic device 100 is used. In addition, the internal memory 121 may include a high-speed random access memory, and may further include a non-volatile memory, for example, at least one magnetic disk storage device, a flash memory device, or a universal flash storage (universal flash storage, UFS).

The electronic device 100 may implement an audio function by using the audio module 170, the speaker 170A, the receiver 170B, the microphone 170C, the headset jack 170D, the application processor, and the like, for example, implement a music playback function and a recording function.

The audio module 170 is configured to convert digital audio information into analog audio signal output, and is also configured to convert analog audio input into a digital audio signal. The audio module 170 may be further configured to encode and decode audio signals. In some embodiments, the audio module 170 may be disposed in the processor 110, or some function modules of the audio module 170 are disposed in the processor 110.

The speaker 170A, also referred to as a "horn", is configured to convert an electrical audio signal into a sound signal. The electronic device 100 may be configured to listen to music or answer a call in a hands-free mode by using the speaker 170A.

The receiver 170B, also referred to as a "handset", is configured to convert an electrical audio signal into a sound signal. When the electronic device 100 is configured to answer a call or receive voice information, the receiver 170B may be put close to a human ear to answer a voice.

The microphone 170C, also referred to as a "mic" or "mike", is configured to convert a sound signal into an electrical signal. When making a call or sending voice information, a user may make a sound approaching the microphone 170C through the mouth, to input a sound signal into the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to be connected to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. The gyroscope sensor 180B may be configured to determine a motion posture of the electronic device 100. In some implementations of this application, the mobile phone 01 may determine, by using the gyroscope sensor, whether the mobile phone 01 is in an absolute static state. The barometric pressure sensor 180C is configured to measure barometric pressure. In some embodiments, the electronic device 100 calculates an altitude by using a barometric pressure value measured by the barometric pressure sensor 180C, to assist in positioning and navigation. The magnetic sensor 180D may include a Hall sensor. The acceleration sensor 180E may detect an acceleration value of the electronic device 100 in each direction (generally three axes). In an implementation of this application, the mobile phone 01 may determine, by using an accelerometer, whether the mobile phone 01 is in an absolute static state. The distance sensor 180F is configured to measure a distance. The electronic device 100 may measure a distance in an infrared or laser manner. The optical proximity sensor 180G may include, for example, a light-emitting diode (LED) and an optical detector, for example, a photodiode. The light-emitting diode may be an infrared light-emitting diode. The ambient light sensor 180L is configured to perceive ambient light brightness. The electronic device 100 may adaptively adjust brightness of the display screen 194 based on the perceived ambient light brightness. The fingerprint sensor 180H is configured to collect a fingerprint. The electronic device 100 may implement fingerprint unlock, application lock accessing, fingerprint photographing, fingerprint-based call answering, and the like by using a feature of the collected fingerprint. The temperature sensor 180J is configured to detect temperature. In some embodiments, the electronic device 100 performs a temperature processing method by using the temperature detected by the temperature sensor 180J. The touch sensor 180K is also referred to as a "touch panel". The touch sensor 180K may be disposed on the display screen 194. The touch sensor 180K and the display screen 194 form a touchscreen, also referred to as a "touch control screen". The bone conduction sensor 180M may obtain a vibration signal. The press key 190 includes a power key, a volume key, and the like. The press key 190 may be a mechanical press key, or a touch key. The electronic device 100 may receive key input, and generate button signal input related to user setting and function control of the electronic device 100. The motor 191 may generate a vibration prompt. The motor 191 may be configured to provide a vibration prompt for an incoming call, and may alternatively be configured to provide vibration feedback for a touch. The indicator 192 may be an indicator light that may be configured to indicate a charging state and a power change, or may be configured to indicate a message, a missed call, a notification, and the like. The SIM card interface 195 is configured to be connected to a SIM card.

A possible hardware structure of the electronic device 100 is described above. It may be understood that the structure shown in this embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by using hardware, software, or a combination of software and hardware.

A software system of the electronic device 100 may use a layered architecture, an event-driven architecture, a micro core architecture, a micro service architecture, or a cloud architecture. In this embodiment of this application, an Android system with a layered architecture is used as an example to describe the software structure of the electronic device 100.

Figure 21:
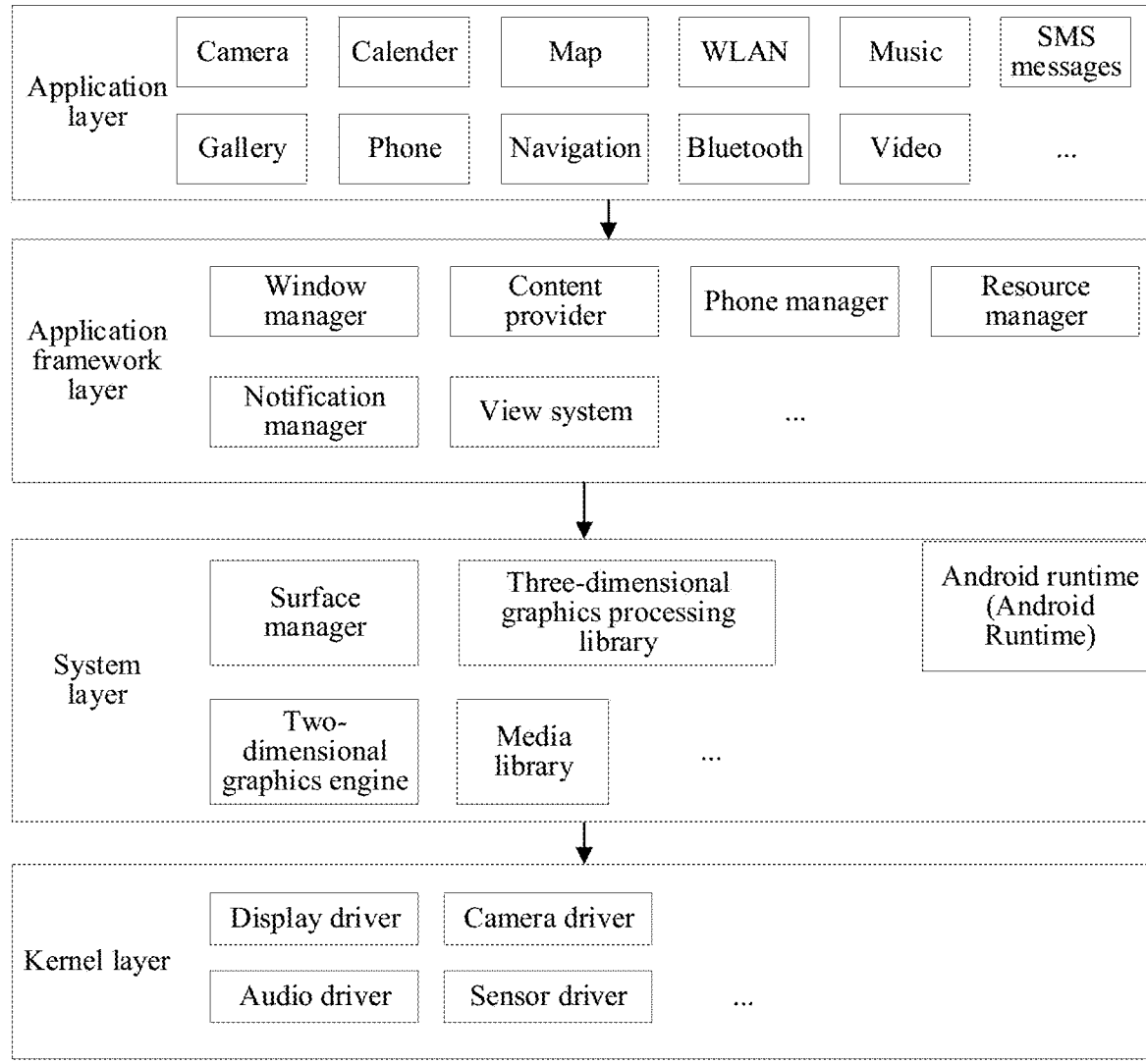
FIG. 21 is a schematic diagram of a software layered structure of an electronic device according to an embodiment of this application.

FIG. 21 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, Android runtime (Android runtime) and a system library, a hardware abstraction layer (hardware abstraction layer, HAL), a kernel layer, a physical layer, and the like from top to bottom.

The application layer may include a series of application packages. As shown in FIG. 21, the application package may include applications such as WeChat, Video, Settings, and Music, and such applications are listed in embodiments of this application.

The application framework layer provides an application programming interface (application programming interface, API) and a programming framework for applications at the application layer. The application framework layer includes some predefined methods.

As shown in FIG. 21, the application framework layer may include a window manager, a content provider, a view system, and the like. The window manager is configured to manage a window program.

The Android runtime includes a core library and a virtual machine. The Android runtime is responsible for scheduling and managing the Android system. The core library includes two parts: One part is a function method that needs to be invoked by a java language, and the other part is a core library of Android.

The application layer and the application framework layer are run in the virtual machine. The virtual machine executes java files of the application layer and the application framework layer as binary files. The virtual machine is configured to perform operations such as object lifecycle management, stack management, thread management, security and exception management, and garbage collection.

The system library may comprise a plurality of function modules, for example, a surface manager (surface manager or surface flinger), a media library (media libraries), a three-dimensional graphics processing library (for example, OpenGL ES), and a two-dimensional graphics engine (for example, SGL), a media library, and an image processing library.

The surface manager is configured to manage a display subsystem, and provide fusion of two-dimensional and three-dimensional layers to a plurality of applications. The media library supports playback and recording in a plurality of common audio and video formats, a static image file, and the like. The media library may support a plurality of audio and video encoding formats, for example, MPEG 4, H.264, MP3, AAC, AMR, JPG, and PNG. The three-dimensional graphics processing library is configured to implement three-dimensional graphics drawing, image rendering, composition, layer processing, and the like. The two-dimensional graphics engine is a drawing engine for two-dimensional drawing. The image processing library may provide an analysis for various image data processing, provide various image processing algorithms, and the like, for example, may provide processing such as image segmentation, image fusion, image blurring, and image sharpening. Details are not described again herein.

The HAL layer is an interface layer located between an operating system kernel layer and a hardware circuit, to abstract hardware. The HAL layer may include a hardware composer (hardware composer, HWC) and the like. The HWC may complete a process of image data combination and display by using hardware, to provide service support for an upper layer.

The kernel layer is a layer between hardware and software. The kernel layer includes at least a display driver, a camera driver, an audio driver, and a sensor driver.

A physical layer (physic, PHY) may be included below the kernel layer, and the physical layer may provide a transmission medium and an interconnection channel for data communication inside a device or between devices, to provide a reliable environment for data transmission. The physical layer may be understood as a transport layer that provides a "signal and medium".

It may be understood that the schematic diagram of the layered architecture of the foregoing software structure is merely an example. In another implementation, the layered architecture of the software structure may alternatively include more or fewer layers, or a layered structure formed in another manner. This is not limited in this application.

An embodiment of this application further provides an electronic device. The electronic device includes: at least one processor, a memory, and a computer program stored on the memory and executable on the at least one processor. When executing the computer program, the processor implements steps in the foregoing method embodiments.

An embodiment of this application further provides a computer-readable storage medium. The computer-readable storage medium stores a computer program, and when the computer program is executed by a processor, steps in the foregoing method embodiments may be implemented.

An embodiment of this application provide a computer program product. When the computer program product run on a mobile terminal, the mobile terminal is enabled to perform steps in the foregoing method embodiments when executing the computer program product.

When an integrated unit is implemented in a form of a software functional unit and sold or used as an independent product, the integrated unit may be stored in a computer-readable storage medium. Based on such an understanding, in this application, all or some of processes in the method in the foregoing embodiments may be implemented by a computer program instructing related hardware. The computer program may be stored in a computer-readable storage medium. When the computer program is executed by a processor, steps in the foregoing method embodiments may be implemented. The computer program includes computer program code. The computer program code may be in a source code form, an object code form, an executable file form, some intermediate forms, or the like. The computer-readable medium may include at least any entity or apparatus capable of adding computer program code to a photographing apparatus/terminal device, a recording medium, a computer memory, a read-only memory (read-only memory, ROM), a random access memory (random access memory, RAM), an electrical carrier signal, a telecommunication signal, and a software distribution medium, for example, a USB flash drive, a removable hard disk, a magnetic disk, or an optical disk. In some jurisdictions, the computer-readable medium cannot be an electrical carrier signal or a telecommunication signal according to legislation and patent practice.

In the foregoing embodiments, descriptions of embodiments have respective focuses. For a part that is not detailed or described in an embodiment, refer to related descriptions in other embodiments.

A person of ordinary skill in the art may be aware that, in combination with examples described in embodiments disclosed in this specification, units and algorithm steps can be implemented by electronic hardware or a combination of computer software and electronic hardware. Whether such functions are performed in hardware or software depends on specific applications and design constraints of the technical solution. A person skilled in the art may use different methods to implement the described functions for each particular application, but it should not be considered that the implementation goes beyond the scope of this application.

In embodiments provided in this application, it should be understood that the disclosed apparatus/network device and method may be implemented in another manner. For example, the described apparatus/network device embodiment is merely an example. For example, division of the modules or units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separated, and the components displayed as units may or may not be physical units, and may be located in one place or may be distributed over a plurality of network units. Some or all of the units may be selected according to actual needs to achieve the objectives of the solutions of embodiments.

In the foregoing descriptions, specific details such as a specific system structure and a technology are proposed for description rather than limitation, to thoroughly understand embodiments of this application. However, a person skilled in the art should understand that this application may also be implemented in other embodiments without these specific details. In other cases, detailed descriptions of well-known systems, apparatuses, circuits, and methods are omitted to prevent unnecessary details from obscuring descriptions of this application.

It should be understood that when being used in this specification and the appended claims of this application, the term "include" indicates presence of a described feature, entirety, step, operation, element, and/or component, but does not exclude presence or addition of one or more other features, entireties, steps, operations, elements, components, and/or sets thereof.

It should be further understood that the term "and/or" used in this specification and the appended claims of this application refers to one or more of any and all possible combinations of the associated items that are listed, and the combinations are included.

As used in this specification and the appended claims of this application, the term "if" may be interpreted according to the context as "when . . . ", "once", "determining in response to", or "detecting in response to". Similarly, the phrase "if it is determined" or "if a [described condition or event] is detected" may be interpreted according to the context as "once it is determined", "in response to determining", "once the [described condition or event] is detected", or "in response to detecting the [described condition or event]".

In addition, in the descriptions of this specification and the appended claims of this application, the terms "first", "second", "third", and the like are merely used to distinguish between the descriptions, and cannot be understood as indicating or implying relative importance.

Reference to "one embodiment", "some embodiments", or the like described in this specification means that a specific feature, structure or characteristic described in combination with this embodiment is included in one or more embodiments of this application. Therefore, the statements "in one embodiment", "in some embodiments", "in some other embodiments", "in some additional embodiments", and the like in the differences in this specification do not necessarily refer to a same embodiment, but mean "one or more but not all embodiments", unless otherwise specially emphasized in other ways. The terms "include", "contain", "have" and their variations mean "including but not limited to", unless otherwise specially emphasized in other ways.

The foregoing embodiments are only provided for describing the technical solutions of this application, but not intended to limit this application. Although this application has been described in detail with reference to the foregoing embodiments, a person skilled in the art understands that modifications may still be made to the technical solutions described in the foregoing embodiments, or equivalent replacements may be made to the part of the technical features. Such modifications or replacements do not cause the essence of corresponding technical solutions to depart from the spirit and scope of the technical solutions in embodiments of this application and shall fall within the protection scope of this application.

The invention claimed is:

1. A method, applied to an electronic device, wherein the method comprises:
    based on the electronic device being in a preset video playback scenario, determining that a user is not using the electronic device and that a video state on the electronic device satisfies a first state condition in the preset video playback scenario; and
    performing at least one operation of reducing power consumption of the electronic device;
    wherein the preset video playback scenario comprises:
        a first video playback scenario in which a currently played video is looped back to a beginning of the currently played video when the currently played video ends;
        a second video playback scenario in which a next video is automatically played when a currently played video ends; or
        a third video playback scenario in which a live streaming state is continued after a livestream ends; and
    wherein the video state on the electronic device satisfying the first state condition in the preset video playback scenario comprises:
        when the preset video playback scenario is the first video playback scenario, a quantity of times the electronic device plays a same video in loop is greater than a first threshold, or a duration in which the electronic device plays a same video in loop is longer than a third preset duration;
        when the preset video playback scenario is the second video playback scenario, a quantity of different videos played by the electronic device in the second video playback scenario is greater than a second threshold, or a duration of playing different videos by the electronic device in the second video playback scenario is longer than a fourth preset duration; and
        when the preset video playback scenario is the third video playback scenario, no second operation performed by the user on the electronic device is detected by the electronic device within a fifth preset duration after the currently played video ends.

2. The method according to claim 1, wherein determining that the user is not using the electronic device comprises at least one of the following:
    determining that a duration in which the electronic device is in a screen-on state is longer than a first preset duration, wherein the screen-on state corresponds to a screen of the electronic device being powered on and actively used for display;
    determining that no first operation performed by the user on the electronic device is detected by the electronic device for more than a second preset duration;
    determining that the electronic device is in a static state; or
    determining that the user is in a sleep state.

3. The method according to claim 1, wherein the electronic device is in the first video playback scenario, and that the video state on the electronic device satisfies the first state condition in the preset video playback scenario comprises:
    the quantity of times the electronic device plays the same currently played video in loop is greater than the first threshold; and/or
    the duration in which the electronic device plays the same currently played video in loop is longer than the third preset duration.

4. The method according to claim 1, wherein the electronic device is in the second video playback scenario, and that the video state on the electronic device satisfies the first state condition in the preset video playback scenario comprises:
    the quantity of different videos played by the electronic device in the second video playback scenario is greater than the second threshold; and/or
    the duration of playing different videos by the electronic device in the second video playback scenario is longer than the fourth preset duration.

5. The method according to claim 1, wherein the electronic device is in the third video playback scenario, and that the video state on the electronic device satisfies the first state condition in the preset video playback scenario comprises:
    no second operation performed by the user on the electronic device is detected by the electronic device within the fifth preset duration after the currently played video ends.

6. The method according to claim 1, wherein the method further comprises:
    when a third operation performed by the user on the electronic device is detected, stopping performing the operation of reducing the power consumption of the electronic device, wherein the third operation comprises at least one of tap/click, double tap/double click, or press performed by the user on the electronic device.

7. The method according to claim 1, wherein the method further comprises:
    displaying a first user interface, wherein the first user interface comprises a first control, and the first user interface is configured to prompt the user that the electronic device is to be controlled to turn off a screen after a sixth preset duration; and
    when no fourth operation performed by the user is detected for the sixth preset duration, controlling the electronic device to enter a screen-off state, and reducing the power consumption of the electronic device, wherein the fourth operation is for controlling the electronic device to stop performing the operation of reducing the power consumption of the electronic device, and the fourth operation comprises an operation of tapping/clicking the first control by the user, and wherein the screen-off state corresponds to the screen of the electronic device being powered off or not actively used for display.

8. The method according to claim 1, wherein the operation of reducing the power consumption of the electronic device comprises at least one of the following:
controlling the electronic device to enter a screen-off state, wherein the screen-off state corresponds to a screen of the electronic device being powered off or not actively used for display;
reducing screen brightness of the electronic device;
reducing resolution and a frame rate of the currently played video;
disabling an update function of a background application of the electronic device; or
switching a network positioning method of the electronic device.

9. The method according to claim 3, further comprising:
obtaining a first image of a first video played by the electronic device at a current moment;
obtaining, at an interval of a seventh preset duration, a second image of a second video played by the electronic device, wherein the seventh preset duration comprises a video duration of the first video; and
determining image similarity between the first image and the second image, and when the similarity between the first image and the second image is greater than a first similarity threshold, determining that the electronic device is in the first video playback scenario.

10. The method according to claim 4, further comprising:
when a first video currently played by the electronic device ends, obtaining a third image of a second video played after the first video; and
recognizing text content in the third image by using an image recognition method, and when the text content in the third image comprises a preset keyword, determining that the electronic device is in the third video playback scenario, wherein the preset keyword comprises a keyword indicating that a type of the second video is of a live video.

11. The method according to claim 1, wherein an Android operating system is deployed in the electronic device, and the Android operating system of the electronic device comprises a video application located at an application layer and a layer display control module located at an application framework layer, wherein
the video application is configured to: receive a playback instruction for a third video; and when the playback instruction is received, send to the layer display control module an instruction for creating a first layer, wherein the instruction at least instructs the layer display control module to create the first layer corresponding to a video type of the third video; and
the layer display control module creates the first layer in response to the instruction, the first layer is for playing the third video, the first layer comprises a layer identifier, and the layer identifier comprises at least information of the video type of the third video; and
the method further comprises:
determining, based on the layer identifier corresponding to the first layer, whether the electronic device is in the third video playback scenario.

12. The method according to claim 11, wherein the application framework layer further comprises a video decoder and a video player, wherein
the video decoder invokes a first function to decode video stream data of the third video, and after completing the decoding for the video stream data of the third video, invokes a second function to end the decoding for the video stream data of the third video; and
the video player is configured to: receive the video stream data of the third video decoded by the video decoder, and send the decoded video stream data of the third video to the layer display control module, to display the decoded video stream data of the third video at the first layer by the layer display control module; and
the method further comprises:
determining, based on a function invoked by the video decoder after invoking the first function, whether the electronic device is in the first video playback scenario, the second video playback scenario, or the third video playback scenario.

13. The method according to claim 12, wherein determining, based on the function invoked by the video decoder after invoking the first function, whether the electronic device is in the first video playback scenario, the second video playback scenario, or the third video playback scenario comprises:
in response to that the video decoder invokes a third function after invoking the first function, determining that the electronic device is in the first video playback scenario;
in response to that the video decoder continues to invoke the first function after invoking the second function, determining that the electronic device is in the second video playback scenario; and
in response to that the video decoder does not invoke the first function after invoking the second function, determining that the electronic device is in the third video playback scenario.

14. An electronic device, comprising:
one or more processors; and
one or more memories, wherein the one or more memories store one or more programs, and when the one or more programs are executed by the one or more processors, the electronic device is enabled to perform the following operations:
based on the electronic device being in a preset video playback scenario, determining that a user is not using the electronic device and that a video state on the electronic device satisfies a first state condition in the preset video playback scenario; and
performing at least one operation of reducing power consumption of the electronic device;
wherein the preset video playback scenario comprises:
a first video playback scenario in which a currently played video is looped back to a beginning of the currently played video when the currently played video ends;
a second video playback scenario in which a next video is automatically played when a currently played video ends; or
a third video playback scenario in which a live streaming state is continued after a livestream ends; and
wherein the video state on the electronic device satisfying the first state condition in the preset video playback scenario comprises:
when the preset video playback scenario is the first video playback scenario, a quantity of times the electronic device plays a same video in loop is greater than a first threshold, or a duration in which the electronic device plays a same video in loop is longer than a third preset duration;
when the preset video playback scenario is the second video playback scenario, a quantity of different videos played by the electronic device in the second video playback scenario is greater than a second threshold, or a duration of playing different videos by the electronic device in the second video playback scenario is longer than a fourth preset duration; and when the preset video playback scenario is the third video playback scenario, no second operation performed by the user on the electronic device is detected by the electronic device within a fifth preset duration after the currently played video ends.

15. The electronic device according to claim 14, wherein determining that the user is not using the electronic device comprises at least one of the following:

determining that a duration in which the electronic device is in a screen-on state is longer than a first preset duration, wherein the screen-on state corresponds to a screen of the electronic device being powered on and actively used for display;

determining that no first operation performed by the user on the electronic device is detected by the electronic device for more than a second preset duration;

determining that the electronic device is in a static state; or determining that the user is in a sleep state.

16. The electronic device according to claim 14, wherein the electronic device is in the first video playback scenario, and that the video state on the electronic device satisfies the first state condition in the preset video playback scenario comprises:

the quantity of times the electronic device plays the same currently played video in loop is greater than the first threshold; and/or the duration in which the electronic device plays the same currently played video in loop is longer than the third preset duration.

17. The electronic device according to claim 14, wherein the electronic device is in the second video playback scenario, and that the video state on the electronic device satisfies the first state condition in the preset video playback scenario comprises:

the quantity of different videos played by the electronic device in the second video playback scenario is greater than the second threshold; and/or the duration of playing different videos by the electronic device in the second video playback scenario is longer than the fourth preset duration.

18. The electronic device according to claim 14, wherein the electronic device is in the third video playback scenario, and that the video state on the electronic device satisfies the first state condition in the preset video playback scenario comprises:

no second operation performed by the user on the electronic device is detected by the electronic device within the fifth preset duration after playback of the currently played video ends.

19. The electronic device according to claim 14, wherein the operations further comprise:

when a third operation performed by the user on the electronic device is detected, stopping performing the operation of reducing the power consumption of the electronic device, wherein the third operation comprises at least one of tap/click, double tap/double click, or press performed by the user on the electronic device.

20. A non-transitory computer-readable storage medium, wherein the storage medium stores instructions, and when the instructions are executed on a computer, the computer is enabled to perform the following operations:

based on an electronic device being in a preset video playback scenario, determining that a user is not using the electronic device and that a video state on the electronic device satisfies a first state condition in the preset video playback scenario; and performing at least one operation of reducing power consumption of the electronic device;

wherein the preset video playback scenario comprises:

a first video playback scenario in which a currently played video is looped back to a beginning of the currently played video when the currently played video ends;

a second video playback scenario in which a next video is automatically played when a currently played video ends; or a third video playback scenario in which a live streaming state is continued after a livestream ends; and wherein the video state on the electronic device satisfying the first state condition in the preset video playback scenario comprises:

when the preset video playback scenario is the first video playback scenario, a quantity of times the electronic device plays a same video in loop is greater than a first threshold, or a duration in which the electronic device plays a same video in loop is longer than a third preset duration;

when the preset video playback scenario is the second video playback scenario, a quantity of different videos played by the electronic device in the second video playback scenario is greater than a second threshold, or a duration of playing different videos by the electronic device in the second video playback scenario is longer than a fourth preset duration; and when the preset video playback scenario is the third video playback scenario, no second operation performed by the user on the electronic device is detected by the electronic device within a fifth preset duration after the currently played video ends.

\* \* \* \* \*